United States Patent
Zimmerer

(10) Patent No.: US 7,765,221 B2
(45) Date of Patent: Jul. 27, 2010

(54) NORMALIZATION OF A MULTI-DIMENSIONAL SET OBJECT

(75) Inventor: Peter K. Zimmerer, Walldorf (DE)

(73) Assignee: SAP AG, Walldorf (DE)

( * ) Notice: Subject to any disclaimer, the term of this patent is extended or adjusted under 35 U.S.C. 154(b) by 196 days.

(21) Appl. No.: 11/314,527

(22) Filed: Dec. 20, 2005

(65) Prior Publication Data

US 2006/0106756 A1   May 18, 2006

Related U.S. Application Data

(63) Continuation-in-part of application No. 10/955,749, filed on Sep. 30, 2004, now Pat. No. 7,415,473.

(51) Int. Cl.
*G06F 17/30* (2006.01)

(52) U.S. Cl. ............ 707/756; 704/224; 708/1; 708/205; 708/207; 708/208; 708/211; 708/212; 708/497; 708/551; 707/692; 707/752

(58) Field of Classification Search ........ None
See application file for complete search history.

(56) References Cited

U.S. PATENT DOCUMENTS

| | | | | |
|---|---|---|---|---|
| 3,742,201 A * | 6/1973 | Groginsky | ............ | 708/410 |
| 5,615,333 A * | 3/1997 | Juettner et al. | ............ | 714/38 |
| 6,917,943 B2 * | 7/2005 | Butler | ............ | 707/100 |
| 6,920,453 B2 * | 7/2005 | Mannila et al. | ............ | 707/6 |
| 6,996,596 B1 * | 2/2006 | Ho et al. | ............ | 708/495 |
| 7,185,016 B1 * | 2/2007 | Rasmussen | ............ | 707/100 |
| 7,343,365 B2 * | 3/2008 | Farnham et al. | ............ | 707/1 |
| 2002/0046201 A1 * | 4/2002 | Hembry | ............ | 707/1 |
| 2002/0099714 A1 * | 7/2002 | Murray | ............ | 707/100 |

(Continued)

FOREIGN PATENT DOCUMENTS

WO    WO 00/41122    * 7/2000

OTHER PUBLICATIONS

Sidney C. Bailin, "A Norminization Theorem For Set Theory", The Journal of Symbolic Logic, 1988, vol. 53, No. 3, pp. 673-695.*

(Continued)

*Primary Examiner*—Apu M Mofiz
*Assistant Examiner*—Hung D Le
(74) *Attorney, Agent, or Firm*—Mintz, Levin, Cohn, Ferris, Glovsky & Popeo, P.C.

(57) ABSTRACT

Methods and apparatus, including computer systems and program products, for normalizing computer-represented collections of objects. A first minimum value can be normalized based on a second minimum value of a universal set object that corresponds to the first set object. The second minimum value is both a minimum value supported by a data type (e.g., 1-byte integer) and a minimum value defined to be in the universal set object (e.g., 0 for a universal set of all natural numbers). Similarly, a first maximum value can be normalized based on a second maximum value of the universal set object where the second maximum value is both a maximum value supported by a data type and in the universal set object. Intervals can be normalized, which can involve replacing half-open intervals with equivalent half-closed intervals. Also, a consecutively ordered, uninterrupted, sequence of values of a set object can be normalized.

11 Claims, 20 Drawing Sheets

U.S. PATENT DOCUMENTS

| | | | | |
|---|---|---|---|---|
| 2002/0138458 | A1* | 9/2002 | Siskind | 706/47 |
| 2002/0161561 | A1* | 10/2002 | Sarma et al. | 703/2 |
| 2002/0161736 | A1* | 10/2002 | Beygelzimer et al. | 707/1 |
| 2003/0093396 | A1* | 5/2003 | Hathaway | 707/1 |
| 2003/0115209 | A1* | 6/2003 | Murray | 707/100 |
| 2003/0216870 | A1* | 11/2003 | Wolber et al. | 702/27 |
| 2004/0153435 | A1* | 8/2004 | Gudbjartsson et al. | 707/1 |
| 2004/0167913 | A1* | 8/2004 | Margolus | 707/100 |
| 2005/0071313 | A1* | 3/2005 | Silverbrook et al. | 707/1 |
| 2005/0120029 | A1* | 6/2005 | Tomic et al. | 707/100 |
| 2006/0074935 | A1 | 4/2006 | Zimmerer | |
| 2006/0106756 | A1 | 5/2006 | Zimmerer | |

OTHER PUBLICATIONS

"About ISETL and ISETLW", http://csis03.muc.edu/isetlw/about.htm, retrieved from the internet Oct. 24, 2005.

Mitchell, "An Extensive Examination of Data Structures, Part 6: Efficiently Representing Sets", Microsoft Visual C# Developer Center, http://msdn.microsoft.com/vcsharp/default.aspx?pull=library/en-us/.., retrieved from the internet Nov. 1, 2004.

"Data Structure and Algorithms, Topic #24, Disjoint Set Structures", *McGill University: School of Computer Science, Winter 1997 Class Notes for 308-251B*, http://www.cs.mcgill.ca/~cs251/OldCourses/1997/topic24, retrieved from the internet Nov. 1, 2004.

Co/Create OneSpace Designer—BOM Editor, © CoCreate Software GmbH & Co. KG (Sep. 2004)—(BOM_Editor_E).

"Definite Clause Grammars (DCGs)", http://www.amzi.com/manuals/amzi7/pro/ref_dcg.htm, retrieved from the internet Nov. 1, 2004.

"Product and Vendor Solution Center: AIMMS—Optimization Modeling System by Paragon Decision Technology B.V.", http://knowledgestorm.techtarget.com/searchcio/Activity?Servlet?ks, retrieved from the internet Nov. 1, 2004.

Dautermann, et al., "ISETL Getting Started Guide", Dec. 2001.

"Chapter 9, Structured Data—Intermediate Techniques", http://www.arjay.bc.ca/Modula-2/Text/CH9/Ch9.html, retrieved from the internet Nov. 1, 2004.

Olsen, et al., "A Generic Bill of Materials based on a Programming Language Notation", 1995, Proceedings Norsk Informatikkkonferanse.

"Part A—Sets, 9.2, Representation and Membership", http://www.csc.twu.ca/rsbook/Ch9/Ch9.2.html, retrieved from the internet Oct. 24, 2005.

"Guide to Prolog Programming", http://kti.mff.cuni.cz/~bartak/prolog/sets.html.

Date, C. J. et al., "Temporal Data and the Relational Model," Ch. 7, Morgan Kaufmann, 2003.

Forlizzi, L. et al., "A data model and data structures for moving objects databases," ACM SIGMOD Record, vol. 29, No. 2, Jun. 2000, p. 319-330.

Weems, B. P., "Operations on sets of intervals—An exercise for data structures or algorithms courses," ACM SIGCSE Bulletin, vol. 21, No. 1, p. 174-176, Feb. 1989.

Communication, Nov. 18, 2008, Application No. 06025744.1-1527 / 1804171.

* cited by examiner

Set
General set

- 115 — Set : EmptySet /* empty set */
- 120 — Set : UniversalSet /* universal set */
- 110 — void : Set() /* static constructor, creates empty and universal set */
- 125 — Set : getEmptySet() /* returns the empty set */
- 130 — Set : getUniversalSet() /* returns the universal set */
- 150 — Set : complement() /* calculates the complement of a set */
- 155 — Set : intersect( Set : aSet ) /* calculates the intersection of two sets */
- 160 — Set : unite( Set : aSet ) /* calculates the union of two sets */
- 165 — boolean : contains( any : anElement ) /* checks if a tuple is an element of a set */
- 135 — boolean : isEmpty() /* checks if a set is the empty set */
- 140 — boolean : isUniversal() /* checks if a set is the universal set */
- 145 — boolean : isEqual( Set : aSet ) /* checks if two sets are equal */

FIG. 1

Ranges Table:

| Sign | Option | Low | High |
|------|--------|--------|---------|
| I | LE | 3.1995 | |
| I | BT | 6.1995 | 12.2001 |
| E | EQ | 6.1995 | |

OpenSQL:

calmonth <= 3.1995 OR calmonth > 6.1995 AND calmonth <= 12.2001

Graphical:

3.1995  6.1995  12.2001

Set Object:

| 3.1995 | 6.1995 | 12.2001 |
|--------|--------|---------|

| 1 | 1 | 0 | 0 | 1 | 1 | 0 |
|---|---|---|---|---|---|---|

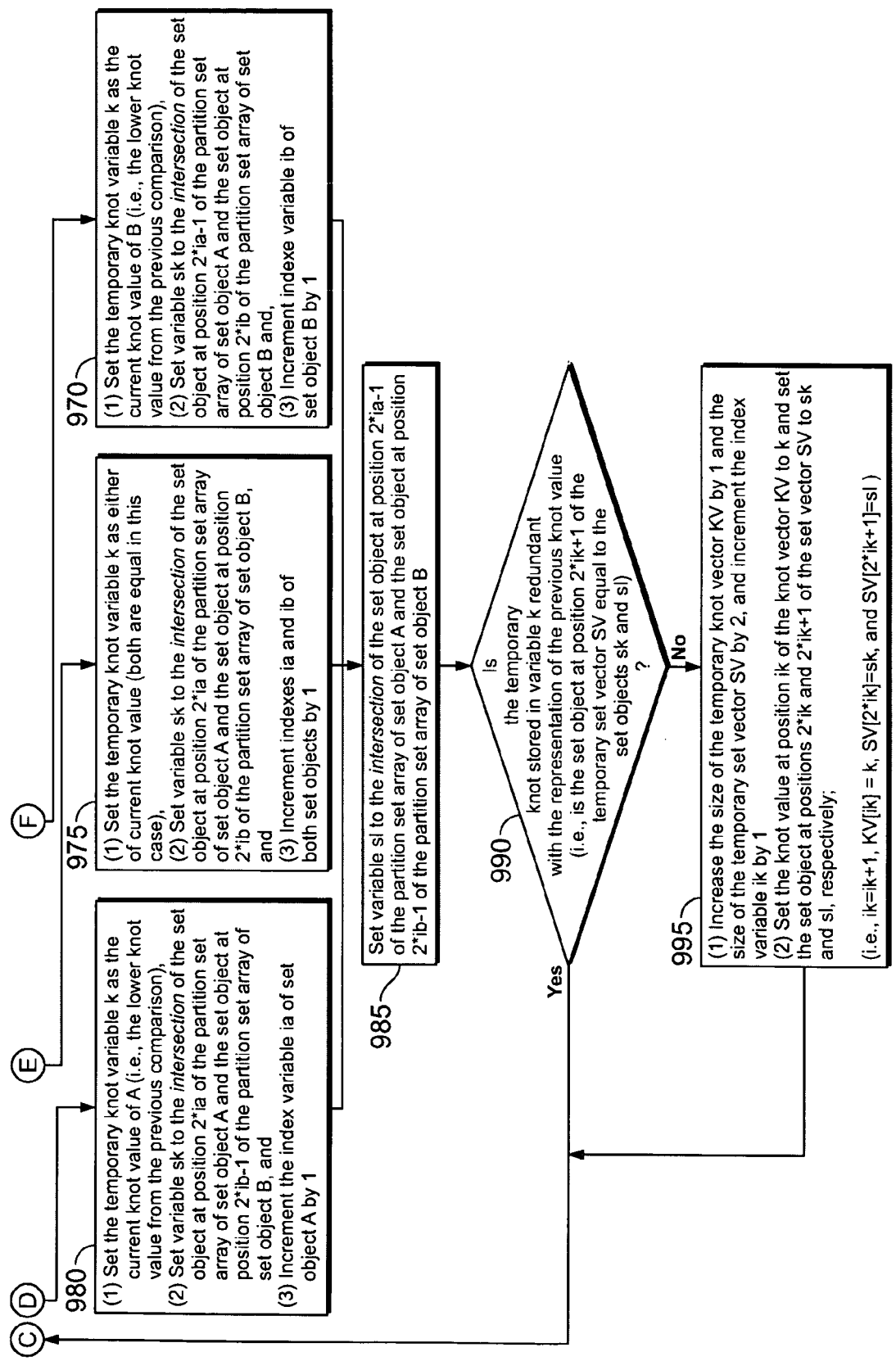

NORMALIZATION OF A MULTI-DIMENSIONAL SET OBJECT

CROSS-REFERENCE TO RELATED APPLICATION

This application in a continuation-in-part of, and claims the priority to, U.S. application Ser. No. 10/955,749, filed Sep. 30, 2004, now U.S. Pat. No. 7,415,473 entitled MULTI-DIMENSIONAL SET OBJECT.

BACKGROUND

The following description relates to systems, techniques, and computer program products for machine-implemented representations of a collection of objects.

Set theory is the mathematical theory of sets, which represent collections of objects. It has an important role in modem mathematical theory, providing a way to express much of mathematics.

Basic concepts of set theory include set and membership. A set is thought of as any collection of objects, called members (or elements) of the set. In mathematics, members of sets are any mathematical objects, and in particular can themselves be sets. Thus, the following can be referred to as sets: the set N of natural numbers {0,1,2,3,4, . . . }, the set of real numbers, and the set of functions from the natural numbers to the natural numbers; but also, for example, the set {0,2,N} which has as members the numbers 0 and 2, and the set N.

Some fundamental sets include the empty set, the universal set, and the power set. The empty set represents that no members exist in the set, the universal set represents all sets in a given context, and the power set of a set U (i.e., P(U)) represents the collection of all subsets of a given universal set U. For two sets, a Cartesian Product set can be defined as a set of all ordered pairs whose first component is an element of a first set and whose second component is an element of a second set.

Some set operations, i.e., operations that are performed on sets, include equality, containedness, complement, union, and intersection. Equality is an operation used to determine if two sets are equal (i.e., all members of one set are in another set and vice versa); containedness is an operation used to determine if one set is within the bounds of another set; complement is an operation used to determine in a given context of a universal set the set of members that do not belong to a given set; union is an operation used to determine a set including members of two sets; and intersection is an operation used to determine a set including members that are common to two sets.

SUMMARY

Described herein are systems, techniques, and computer program products for machine-implemented representations of a collection of objects.

In one general aspect, the techniques feature a method of representing a collection of objects in a computer system. The method includes providing data structure definitions that define a set object to represent the collection of objects; and generating, with a computer-implemented constructor using the one or more data structure definitions, a set object representing the collection of objects.

Implementations may include one or more of the following features. The data structure definitions may define the set object to be a one-dimensional set object including one or more ranges of elements. The data structure definitions may define the set object to be a one-dimensional set object including a first list of knot elements, a second list representing the knot elements that the one-dimensional set includes, and a third list representing elements, other than the knot elements, that are included in the one-dimensional set. The first list may be a one-dimensional vector of values corresponding to the knot elements of a one-dimensional set. The second and third lists may be defined to be alternating elements of a one-dimensional bit vector where the third list is defined to indicate whether the one-dimensional set includes a range that is bound by one or more knot elements. The second list and the third lists may be separate one-dimensional bit vectors where the third list is defined to indicate whether the one-dimensional set includes a range that is bound by one or more knot elements.

The data structure definitions may define the set object to be a multi-dimensional set object including a union of blocks of a partition, where each block defines a disjoint collection of the objects. The multi-dimensional set object may be defined to include a first list of knot elements, a second list representing blocks corresponding to the knot elements that the multi-dimensional set includes, and a third list representing blocks corresponding to elements, other than the knot elements, that are included in the multi-dimensional set.

A multi-dimensional set object may be defined to include a Cartesian Product of two or more dimensions of the collection of the objects. The Cartesian Product may be defined to include two references to set objects, where a first reference corresponds to a first Cartesian Factor and a second reference corresponds to a second Cartesian Factor. In that case, the references are ordered such that the references define a Cartesian Product of the collection of the objects. A multi-dimensional set object may include set objects nested within the multi-dimensional set object.

A multi-dimensional set object may be defined to include a union set. In that case, the union set includes blocks of a partition such that each block defines a disjoint collection of the objects and each block is a reference referring to a one-dimensional set, a union set, an empty set, a universal set, or a Cartesian Product set. In that case, the Cartesian Product set includes a Cartesian Product of a first Cartesian Factor being a one-dimensional set and a second Cartesian Factor being a reference referring to a union set, a Cartesian Product Set, or a one-dimensional set.

A multi-dimensional set object may be defined to include a Cartesian Product set, including a Cartesian Product of a first Cartesian Factor being a one-dimensional set and a second Cartesian Factor being a reference referring to a union set, a Cartesian Product Set, or a one-dimensional set. In that case, the union set includes blocks of a partition such that each block defines a disjoint collection of objects and is a reference to a one-dimensional set, a union set, an empty set, a universal set, or a Cartesian Product set.

The one or more data structure definitions may define the set objects as normalized sets. The generated set object may represent data on a storage medium. In that case, the method further includes receiving a query; and computing the result to the query, such that computing the result to the query includes determining whether to access the data in the storage medium based on the generated set object.

The one or more definitions may define operations for set objects, including, an operation to determine an intersection of two or more set objects, an operation to determine a union of two or more set objects, an operation to determine whether a set object includes a range, and an operation to determine a complement of a set object.

In another aspect, a computer program product tangibly embodied in an information carrier includes one or more data structure definitions including a constructor method for generating a set object. In that product, the set object represents sets in a computer system.

Implementations may include one or more of the following features. The data structure definitions may define a one-dimensional set object as one or more ranges of elements. The data structure definitions may define a one-dimensional set object to include a first list of knot elements, a second list representing the knot elements that the one-dimensional set includes, and a third list representing elements, other than the knot elements, that are included in the one-dimensional set.

The data structure definitions may define the set object to be a multi-dimensional set object that includes a union of blocks of a partition, where each block defines a disjoint collection of the objects. The multi-dimensional set object may be defined to include a first list of knot elements, a second list representing blocks corresponding to the knot elements that the multi-dimensional set includes, and a third list representing blocks corresponding to elements, other than the knot elements, that are included in the multi-dimensional set.

The data structure definitions may define a multi-dimensional set object to include a Cartesian Product of two or more dimensions of a collection of objects. The multi-dimensional set object may be defined to include two references to set objects. In that case, a first reference corresponds to a first Cartesian Factor and a second reference corresponds to a second Cartesian Factor, and the references are ordered such that the references define a Cartesian Product of the collection of the objects.

The generated set object may represent data on a storage medium. In that case, the computer program product includes instruction to cause data processing apparatus to perform operations including receiving a query; and computing the result to the query, such that computing the result to the query includes determining whether to access the data in the storage medium based on the generated set object.

The one or more definitions may define operations for the set object to include an operation to determine an intersection of two or more set objects, an operation to determine a union of two or more set objects, an operation to determine whether the set object includes a range, and an operation to determine a complement of the set object.

In another aspect, a computer program product, tangibly embodied in an information carrier, includes instructions to normalize a first minimum value, a first maximum value, or both the first minimum and maximum values of a first set object in accordance with a first process, and perform a set operation on a normalized version of the first set object that was normalized in accordance with the first process. In that product, the first minimum value is normalized based on a second minimum value of a universal set object that corresponds to the first set object, and the second minimum value is both a minimum value supported by a data type (e.g., 1-byte integer) and a minimum value defined to be in the universal set object (e.g., 0 for a universal set of all natural numbers). Similarly, the first maximum value is normalized based on a second maximum value of the universal set object, where the second maximum value is both a maximum value supported by a data type and in the universal set object.

Implementations may include one or more of the following features. The first minimum value of the first set object may be modified if the first minimum value is the same as the second minimum value.

The first set object may use a combination of knot elements and partition entries to represent a collection of objects. The first minimum value may be a minimum knot element of the first set object and the instructions to modify the first minimum value may include instructions to modify the first set object to include a value of a second partition entry in a first partition entry, where the first and second partition entries are in an ordered sequence of partition entries with the first partition entry being before the second partition entry. The partition entry may be a partition bit or partition set.

The first maximum value may be a maximum knot element of the first set object, and the first maximum value of the first set object may be modified if the first maximum value is the same as the second maximum value.

The instructions to modify the first maximum value may include instructions to modify the first set object to include the value of a penultimate partition entry in a last partition entry.

The normalized version of the first set object may be further normalized in accordance with a second process. Normalizing in accordance with a second process may include normalizing consecutively-ordered elements of the first set object in accordance with the second process, where a first element is in a first ordered sequence before the second element and the universal set object includes the first and second elements as an uninterrupted second ordered sequence of elements.

The normalized version of the first set object may be further normalized in accordance with a third process. Normalizing in accordance with the third process may include normalizing representations of intervals in a first set object. The intervals may represent a span of objects in the first set object. Both he second and third processes may be used individually, or in any combination with the each other or the first process to normalize the first set object.

Normalizing consecutively-ordered knot elements of the first set object may include removing one of the first element or the second element. The first and second elements are knot elements that have corresponding partition entries, and removing one of the first element or the second element may include removing the first element and a corresponding partition entry representing inclusion of the first element in the first set object.

The intervals may be normalized to generate a single representation of a same span of objects across different set objects, and normalizing the representations may include replacing a half-open interval with an equivalent half-closed interval. Replacing a half-open interval with an equivalent half-closed interval may include removing a knot element and corresponding partition entry of the first set object.

The systems, techniques, and computer program products for machine-implemented representations of a collection of objects described here may provide one or more of the following advantages.

A set object may be provided that approximates and models real world collections of objects. To generate approximations, a certain completeness may be provided; in other words, operations on objects of a model will not lead to objects that cannot be represented by the model; otherwise, problems may occur like the approximation of numbers in a computer system that may lead to rounding problems, underflow exceptions, and overflow exceptions. To achieve completeness in the sense that set operations such as complement, intersection and union within the model will not lead to sets that the model cannot represent, the set object may be adapted. For example, sets may be normalized under certain conditions. Efficient algorithms for basic set operations, such as intersection, complement, and union, may also be provided.

The set object may improve the efficiency and/or provide an intelligent way to express collections of objects for techniques and/or systems that involve near-line storage, planning, and authorization.

The set objects may be normalized to provide a consistent representation of objects in a set. One or more types of processes can be used to generate different types of normalization. The processes for normalizing set objects may be optimized such that consistent, reproducible results are generated when operations are performed on normalized set objects. As an example, for a universal set being the set of all integers, the sets i<4 and i≦3 represent the same integer values; however, they could each have different representations in a computer. By providing a method of normalizing set objects, different representations of these sets might be changed to one type of representation. Advantageously, a consistent representation might ensure consistent results and ease the implementation of operations on set objects. For example, if one desired to implement an operation to determine if two sets were identical, it might be easiest to simply check to see if their representations are identical. However, if the representations differ, there might be inaccurate results (e.g., a determination that two sets are not equal, although only their representations differ) or the operation might require a much more complex implementation that takes into account inconsistencies between representations of sets. Advantageously, a combination of processes for normalizing set objects might be used as a practical approach to achieving consistently normalized set objects. For example, normalizing a set object can include normalizing maximum and minimum values, removing redundant values, consistently representing intervals, and consistently representing consecutive values.

In addition, normalization may simplify user input when a set is defined by a user. For example, a user of a software application can enter different selection conditions to define a same set of objects, and the resultant sets objects can be normalized so that the set objects are consistently defined within the computer. For example, a user could enter, for the universal set of integer values n, the condition "n BETWEEN 6 AND 9." Yet, the computer might generate a normalized set object and interpret that set object as being equivalent to the conditions "n IN (6,7,8,9)," "n>=6 AND n<10," or any other variant.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

FIG. 1 illustrates a model of representing a set as a set object.

FIGS. 9A through 9C include a flowchart for calculating the intersection of two multi-dimensional set objects.

Like reference numbers and designations in the various drawings indicate like elements.

DETAILED DESCRIPTION

Figures 2A, 2B, 2C, 2D:
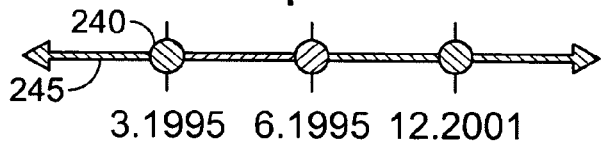
FIGS. 2A through 2D illustrate various representations of collections of objects.

The systems and techniques described here relate to machine-implemented representations of a collection of objects.

Overview

A model for representing sets as set objects may be described in the following pages in accordance with the following chain of subsets in an arbitrary universal set U:

$$C \subseteq S \subseteq T \subseteq U$$

In that chain of subsets, U is a given universal set that need not be finite and is not necessarily completely representable on a computer system (e.g., U could be the set of real numbers); however, the elements of U are ordered. T will be an approximation of U that has a representation in a certain programming language and on a certain hardware platform (e.g., T could be the set of all different values which can be stored in a variable of data type float). S can be the set of all values that are allowed by an application, developed with the programming language, as possible input. The elements of S need not be stored and enumerated until the first time they are used. Finally, C is the set of all values that are in current use at a certain time (e.g., persistently or transiently) by the application.

Data structures that represent sets within the chain of subsets can be described as representations of a closed subset M of the power set of P(U). "Closed" means that for each element of M, the complement with respect to U is also an element of M. In addition, for two arbitrary elements of M, their intersection and their union are elements of M.

The four kinds of sets (C, S, T, and U) can also be described with how they typically can change over time. For the universal set U, there is an assumption that the elements of U are fixed in time. The set T can change in time when the data type of T is replaced by a new one which includes all values of the previous one and which is still a subset of the universal set U (e.g., changing the data type of a certain domain from 4-byte integer to 8-byte integer, or from float (single-precision) to double, or increasing the length of a character domain (the data type of a character domain and the concept of domains are concepts from Advanced Business Application Programming (ABAP); ABAP specification available from SAP AG of Walldorf (Baden), Germany). The set S can also change over time, and can change more frequently than T. For example, the set S can change when an application's logic for checking user input is changed (e.g., if an application accepts a larger range of input). In such a scenario, a change of S must not exclude values of C. C can be the most frequently changed set (e.g., elements (or values) can be added to C whenever new values are entered into the system as input).

Representation of Sets

In general, if all possible subsets for a given universal set U are to be included in a computer representation of sets, all elements of the power set P(U) of U should be considered. If U cannot be represented on a computer system, then P(U)

cannot be represented as well. A certain subset of P(U) should be defined such that the subset can be represented on a computer system and the subset can have the property of being complete, as described earlier. This should also be the case when there exists one subset of P(U) which has the property of completeness and has the same property of completeness for all universal sets U (i.e., all types of universal sets, where each set may have a different context). An example of a subset of P(U) for an arbitrary universal set where U is complete with respect to basic set operations is the set that includes the empty set Ø and the universal set U (e.g., a set A={U, Ø} (i.e., in general, a representation should be a subset of P(U) such that the representation still forms a proper Boolean Algebraic representation with respect to intersection and union operations).

In developing a representation of sets, the above model can be used as a basis for a one-dimensional representation of a set and a multi-dimensional representation of a set can include nested sets. An initial model may include simply the empty set Ø and the universal set U. Within this, the basic set operations are well defined and complete for a subset of the power set. Each set is the complement of the other; the intersection is the universal set U if the operands are the universal set and the empty set; and the union is the empty set if the operands are the empty set and the universal set.

FIG. 1 illustrates a model of representing a set as a set object. In the model, a set object represents a set according to the initial model described above, and includes a single class called Set 105 (i.e., a single data structure definition). The creation of instances (e.g., creation of instances via a constructor method) is private, where the class Set 105 has a static constructor 110 that can be used to create instances of sets that can be stored in private static attributes Empty Set 115 and Universal Set 120, where Empty Set 115 can represent the empty set, and Universal Set 120 can represent the universal set. After an instance is created, the public static methods getEmptySet( ) 125 and getUniversalSet( ) 130 can be used to obtain a reference to the empty and universal sets, respectively, depending on the type of instance that is created.

The public boolean methods isEmpty( ) 135 and isUniversal( ) 140 are used to determine whether a set object represents the empty set or the universal set. The method isEmpty( ) 135 returns true if a set object represents the empty set (i.e., an instance stored in static attribute Empty Set 115 represents the empty set) and returns false otherwise. Likewise, the method isUniversal( ) 140 returns true if a set object represents the universal set and returns false otherwise.

The model also includes basic set operations, including, equality, complement, intersection, union, and containedness. The equality operation is represented by the public method isEqual( ) 145, and determines whether two sets are equal (i.e., whether two set objects represent the universal set or the empty set). Complement is represented by the public method complement( ) 150, which returns a reference to the empty set if the set object represents the universal set and a reference to the universal set if a set object represents the empty set. Intersection is represented by the public method intersection( ) 155, which returns the intersection of the current set with the set aSet (i.e., the argument of the method). If the set object represents the empty set, the empty set is returned (i.e., regardless of the argument, the result should be the empty set); otherwise, the set is the universal set, so the argument is returned. The union operation is represented by the public method unite( ) 160, which returns the union of the current set with the set passed as argument. If a set object represents the universal set, the universal set is returned. If a set object represents the empty set, the argument (i.e., the argument passed to unite( ) 160) is returned. The containedness operation is represented by the public method contains( ) 165, which returns false for the empty set and true for the universal set.

Representation of a One-Dimensional Set

A second model may be developed based on the initial model discussed above. The second model includes a set object for a multi-dimensional universal set U that is defined as the Cartesian Product of multiple one-dimensional universal sets $U_d$. Having a multi-dimensional set U can be used to differentiate among dimensions. Differentiating among dimensions may be useful even if there are two dimensions that have the same data type. For example, the dimension can be an abstraction used to differentiate between domains that have the same data type (and also the same universal set U) but different roles within an application's data model. As an example, two or more key-columns of a relational database table may be in a separate dimension although two or more of the key-columns are of the same data type. To differentiate among dimensions, a time-independent order of the dimensions may be defined. This order could be defined, for example, by the order of columns in a key (i.e., a primary index), by the alphabetical order of associated column names in a table, or by an order defined by an application that uses set objects.

Although multiple dimensions are defined, the empty set and the universal set might not be assigned to a specific dimension. Instead, they may be defined to be members of a dimension with a positive infinite order. Thus, the dimension of any sets other than those represented by the empty or universal set is less than the dimension of the empty set and the universal set.

Dimensions in the second model are identified in the following by a unique index number running from 1 to the maximum number of dimensions. In the case where each set object represents one-dimensional sets, arbitrary universal sets $U_d$ (i.e., one-dimensional universal sets of a dimension d) are defined in accordance with the rules: the elements of $U_d$ are ordered, and at least one non-empty subset $T_d \subseteq U_d$ can be represented by a data type on a computer system.

The description of the second model will be restricted to the subset $M_d$ of the power set of $U_d$ which is given by all elementary sets defined by the function:

$$\Theta(t, R) := \{u \in U_d | u \, R \, t\} \text{ with } t \in T_d \text{ and } R \in \{\leq, \geq\},$$

where $\Theta(\ )$ represents a function which maps a value t within $T_d$ and a given binary relation R to a subset of $U_d$; u is an element of $U_d$; "u R t" represents a boolean operation R where u and t are operands; and R includes the operations less than or equal to and greater than or equal to. In addition to the elementary sets $\Theta(t, R)$, the set $M_d$ contains all sets that can be defined by expressions upon these elementary sets using complement (with respect to $U_d$), intersection, and union operations. Functions for other binary relations like $<, >, =,$ and $\neq$ can be derived using the operations of complement, intersection, and union, and can be represented by sets in accordance with that function.

Other relations can be derived from the following functions, such as $$\Theta(t, <) := \{u \in U_d | u < t\} = \{u \in U_d | \neg u \geq t\} = \backslash \Theta(t, \geq),$$

$$\Theta(t, >) := \{u \in U_d | u > t\} = \{u \in U_d | \neg u \leq t\} = \backslash \Theta(t, \leq),$$

$$\Theta(t, =) := \{u \in U_d | u = t\} = \{u \in U_d | u \geq t \land u \leq t\} = \Theta(t, \geq) \cap \Theta(t, \leq), \text{ and}$$

$$\Theta(t, \neq) := \{u \in U_d | u \neq t\} = \{u \in U_d | \neg u = t\} = \backslash (\Theta(t, \geq) \cap \Theta(t, \leq));$$

where '\' denotes the complement of a set with respect to the universal set $U_d$ and '¬' denotes the boolean 'not' operator.

FIGS. 2A through 2D illustrate various representations of collections of objects. FIG. 2A illustrates a ranges table 205, FIG. 2B illustrates a Structured Query Language (SQL) expression 210, FIG. 2C illustrates a graphical representation 215 of a set, and FIG. 2D illustrates a set object 220 including a vector of knot values 225 and a vector of partition bits 230. Each of these represents the same collection of objects. Those objects include all numbers less than or equal to 3.1995, and all numbers greater than 6.1995 and less than or equal to 12.2001. The numbers 3.1995, 6.1995, and 12.2001 are an external representation of calendar month values with the format mm.yyyy where mm denotes a month and yyyy denotes a year. They are ordered according to the year (first) and the month (second).

To represent these objects, the ranges table 205 includes three rows, each of which represents a range of numbers that should be included or excluded, as indicated by the sign and the option (a ranges table is a table, which for example can be a data structure, that stores ranges of values, where each row indicates a range of values). The first row represents that all values less than or equal to 3.1995 should included, the second row represents that all values between 6.1995 and 12.2001 should be included, and the third row represents that all values representing 6.1995 should be excluded.

The SQL expression 210 is an expression of a "where" clause. The "AND" and "OR" clauses, and the operators <, >, and <= are used to represent relationships among values.

The graphical representation 215 uses knots and links to represent the collection of the objects. A knot is a dot along line 235 and a link is a line segment between two knots (or above or below end-knots). A knot and/or a link may be colored to indicate the inclusion of one or more members. For example, the knot 240 and the link 245 may be colored to indicate the inclusion of 3.1995 and all members less than 3.1995.

The set object 220 uses a combination of the vector 225 of knot values and the vector 230 of partition entries to represent a collection of objects. In FIG. 2D, the set object is a one-dimensional set object; in other words, the set object represents a one-dimensional set of objects. The knot values represent values of a set that partition members of the set represented by the set object 220. In FIG. 2D, the vector 225 represents knot values as a vector of calendar months (i.e., a data type that represents calendar months). For example, the knot vector 225 of the set object 220 includes the knot values 3.1995, 6.1995, and 12.2001 (i.e., March 1995, June 1995, and December 2001).

The entries included in the vector 230 include a first list that represents the knot values the set object 220 includes, and a second list that represents elements, other than the knot values, that are included in the set object 220. These two types of lists have list elements that alternate in the partition vector 230. In the set object 220, each knot value has three corresponding entries in the partition vector 230 such that corresponding values in the partition vector 230 represent whether values below, at, or above a corresponding knot value are in the set represented by the set object 220. Each entry in the partition vector 230 is represented by a bit (i.e., 1 or 0) such that the entries in the partition vector 230 are also known as partition bits. For example, the knot value 250 corresponds to partition bits 255, 260, and 265. In that example, the knot value 250 represents the value 3.1995, the partition bit 255 represents that the set represented by the set object includes elements below 3.1995, the partition bit 260 represents that the set includes elements at 3.1995, and the partition bit 265 represents that the set excludes elements above 3.1995 but below 6.1995. The set object 220 can be generated from, for example, the ranges table 205. Thus, for example, a user can input values into a ranges table and the ranges table can be used to generate a set object.

To represent sets in a consistent fashion, such that elements in a set would have the same representation in any two set objects, the set object 220 is normalized. The set object 220 is normalized such that, at least the following rules are adhered to: there are no redundant knot values (i.e., no two knot values are alike), and knot values are represented in an increasing order. For every knot the corresponding knot bit must not be equal to the two surrounding link bits together. If a knot bit and its two surrounding link bits are equal (i.e., they are either all 0 or all 1) the knot value may be removed from the knot value vector together with the corresponding knot bit and one of the two link bits from the link bit vector (the size of the set is decreased by 1 by this operation). These instructions can be repeated until the set is either normalized or all knot values are removed from the knot value vector. In the latter case, the normalized representation of the set is not a one-dimensional set, rather the set is either the empty set (if the solely remaining link bit is 0) or the universal set (if the solely remaining link bit is 1). In other implementations, additional and/or different rules may be used to normalize the representation of sets as set objects.

As will be discussed in further detail later, the set object 220 can be represented in a computer system as a data structure that includes a knot vector, such as the vector 225, and a partition vector, such as the vector 230. For example, in an object-oriented language such as C++, the set object may be represented as a class that includes a vector of float values and a bit vector. In alternative implementations any types of values may be used to represent the vectors. For example, the partition vector need not be represented as a bit vector. Also, in alternative implementations any number of vectors can be used to represent the set object 220. For example, each of the two lists that are included in the partition vector 230 may exist in a corresponding vector, such that there are two vectors.

Set Object Data Structure: One-Dimensional Set

Referring back to the second model discussed above, a one-dimensional set S can be a true subset of a dimension's universal set $U_d$ and a true superset of the empty set Ø.

Figure 3:
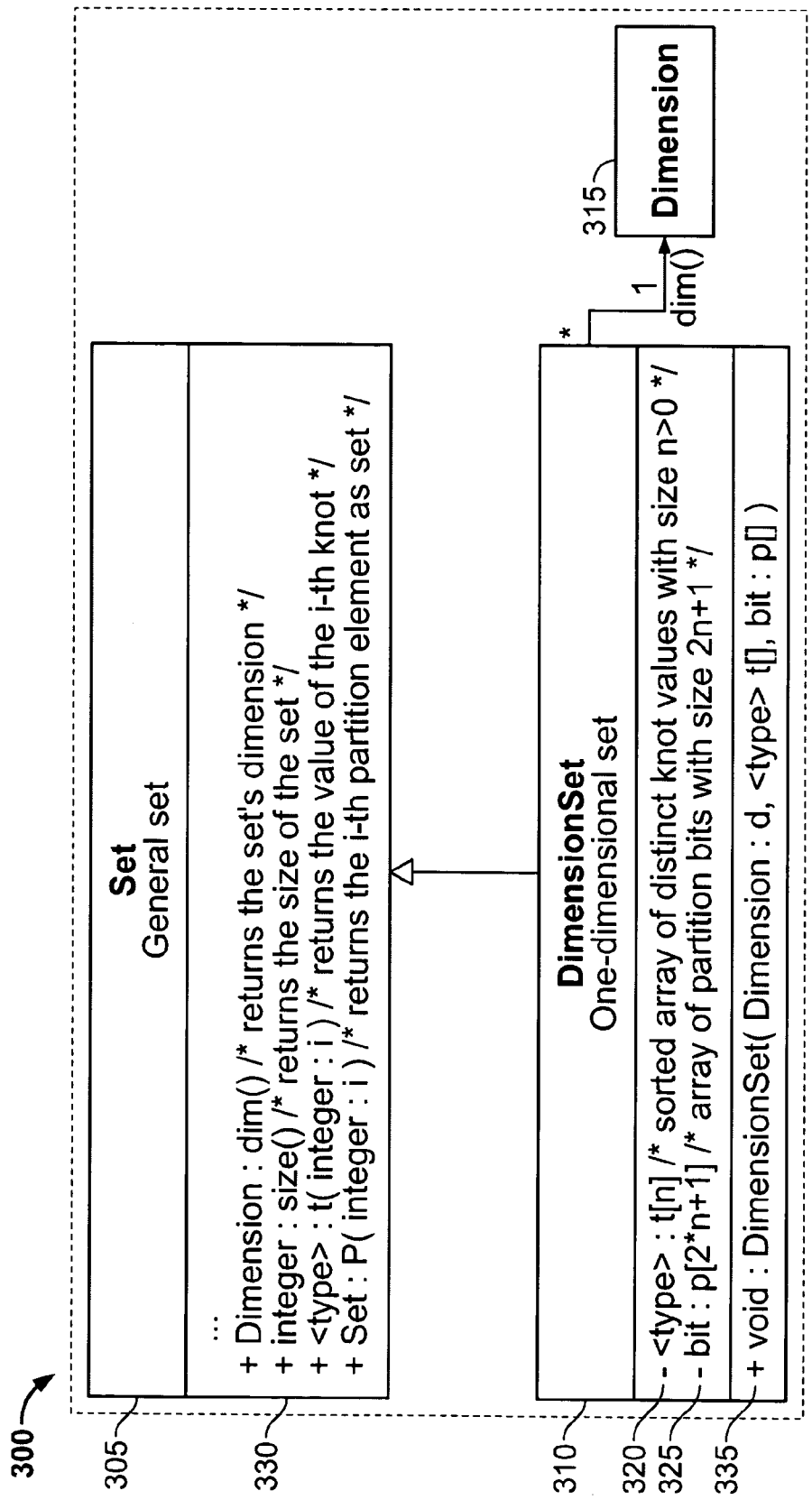
FIG. 3 illustrates a model of representing a set as a one-dimensional set object.

FIG. 3 illustrates a model 300 of representing a set as a one-dimensional set object. The model 300 is similar to a Unified Modeling Language (UML) diagram and is an example of a data structure definition that can be used to generate a one-dimensional set object in accordance with a model similar to the second model. The model 300 includes a class Set 305 (which may be similar to the class Set 105 of FIG. 1), a class DimensionSet 310, and a variable of data type Dimension 315.

In the model 300, an unnormalized representation of a one-dimensional set is defined by the class DimensionSet 310 to include a knot value collection as a sorted array t[ ] 320, where the array t[ ] 320 is a size n and n represents the size of a one-dimensional set represented by the set object (e.g., for a set S, S.t[i] being elements of T, where i is an integer from 1 to the size n of a set represented by the array). The unnormalized representation further includes a bit array 325 (i.e., a partition vector that is implemented as a bit array) p[ ] of size 2n+1 (i.e., the size of the array depends on the size of the corresponding knot value collection). As an example, if a set object represents a set S, where S includes {2, 3, 4}, the size n would be 3, the size of the array t[ ] 320 would be 3, and the size of the bit array p[ ] would be 7. In the model 300, the method size( ) 330 returns the size of a set represented by a set object (e.g., the size of t[ ]=n).

In the array p[ ] 325, the first bit p[1] indicates whether all values less than t[1] belong to a set represented by the set object. Because p[ ] 325 is a bit array, 1 can be used to indicate that all values less than t[1] are included in the set represented by the set object and 0 can be used to represent that those values are not included. The last bit p[2n+1] indicates whether all values greater than t[n] belong to the set. All other bits either represent a link (i.e., a range of values between two knot values) or a knot value, and whether a link or a knot value is included in the set. Link bits include bits p[2i+1], where 1<i<n−1. Thus, each link bit p[2i+1] indicates whether all values greater than t[i−1] and less than t[i] belong to the set. Knot bits include the bits p[2i], where 1≦i≦n. Thus, each bit p[2i] indicates whether the knot value t[i] belongs to the set.

Thus, the knot value array t[ ] 320 defines a partition of the universal set $U_d$ (i.e., a partition in the sense of set theory such that a partition of the set $U_d$ is a set of nonempty subsets of $U_d$ such that every element u in $U_d$ is in exactly one of these subsets) having 2n+1 blocks (i.e., disjoint subsets). The blocks for a set S can be defined by $$S.\Pi(1):=\{u \in U_d | u<S.t(1)\};$$

$$S.\Pi(2i):=\{u \in U_d | u=S.t(i)\}, i=1 \ldots n;$$

$$S.\Pi(2i+1):=\{u \in U_d | u>S.t(i) \wedge u<S.t(i+1)\}, i=1 \ldots n-1; \text{ and}$$

$$S.\Pi(2n+1):=\{u \in U_d | u>S.t(n)\};$$

where n is the size of the set, S.t(i) is a method that returns the value of the i-th knot (i.e., S.t(i):=S.t[i]), each S. Π( ) represents a block of the partition, and u is a value within a multi-dimensional universal set $U_d$. In that description of partitions, the first block (i.e., S.Π(1)) includes values u, from the universal set, below the first knot value (i.e., S.t(1)); each 2i-th block includes only a single value u of the universal set, that is equal to the corresponding i-th knot value; each (2i+1)-th block includes values u, from the universal set, that are greater than an i-th knot value and less than an (i+1)-th knot value; and a (2n+1)-th block includes values u, from the universal set, that are greater than the n-th knot value.

In the description of blocks, the blocks obey the partition rules:

S.Π(i)∩S.Π(j)=Ø, i≠j (i.e., no blocks overlap); and $$\bigcup_{i=1}^{2n+1} S.\Pi(i) = U_d$$

(i.e., the union of all blocks is equal to the universal set $U_d$).

If a method S.P(i) is introduced such that:

$$S.P(i) := \begin{cases} U, & S.p[i] = 1 \\ \emptyset, & S.p[i] = 0 \end{cases}$$

where the method returns either an empty set or a universal set for an i-th block depending on whether an entry in the partition array p[ ] 325 for the set S includes 1 or 0, a one-dimensional set S can be expressed as:

$$S := \bigcup_{i=1}^{2n+1} S.\Pi(i) \cap S.P(i).$$

Accordingly, the class DimensionSet 310 is defined such that a union of all intersections of each block and the result of S.P(i) is included in the one-dimensional set S. Thus, the class DimensionSet 310 is defined such that the knot vector defines a partition of the universal set $U_d$ and a corresponding vector of indicators whether a block of the partition belongs to the one-dimensional set represented by the class DimensionSet 310 or not. In alternative implementations the class DimensionSet 310 may define normalized sets, thus, the a constructor 335 of the class DimensionSet 310 can guarantee that only normalized instances of class DimensionSet 310 are created.

Representation of a Multi-Dimensional Set

Figure 4:
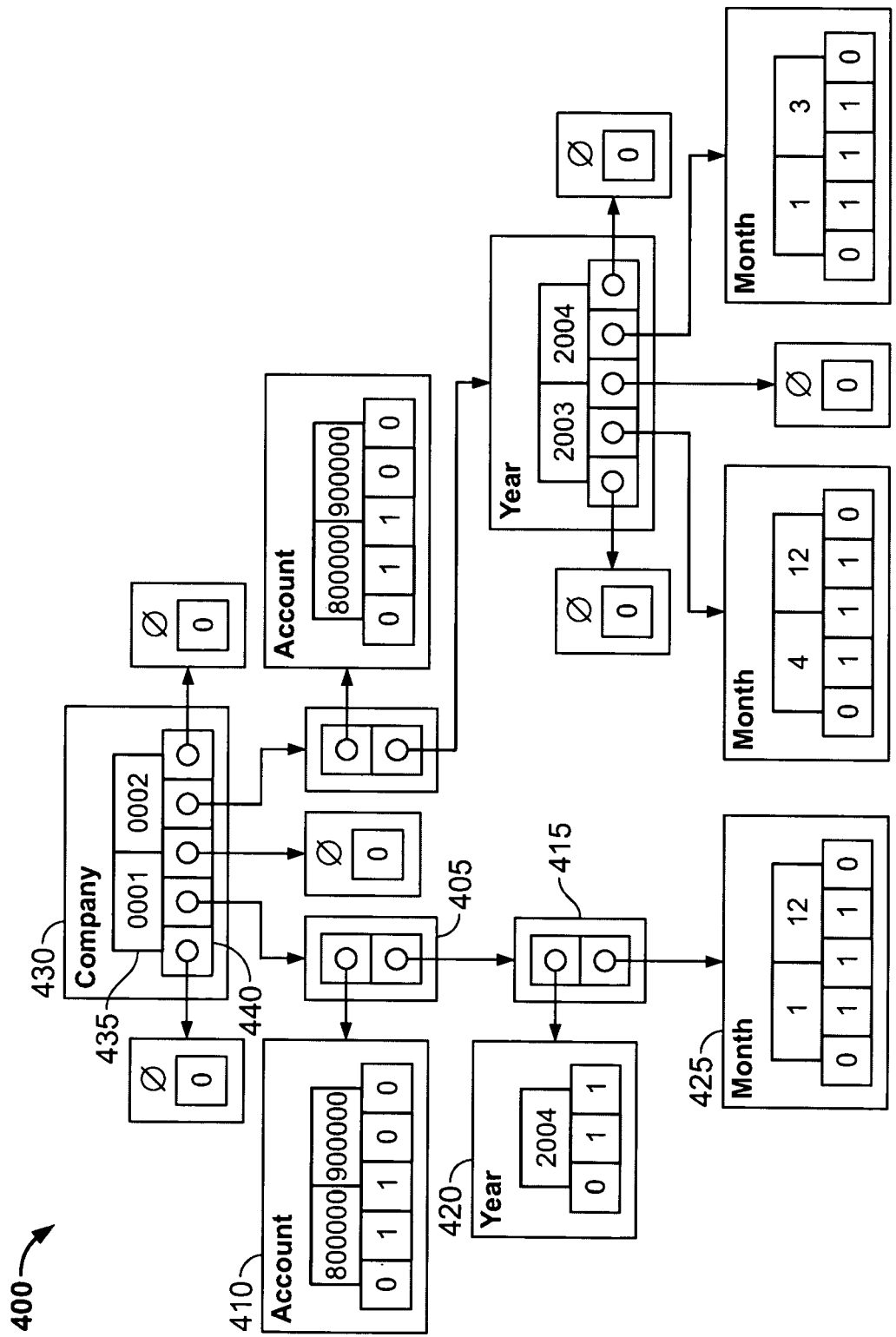
FIG. 4 illustrates a multi-dimensional set object.

FIG. 4 illustrates a multi-dimensional set object 400. The example multi-dimensional set object 400 represents a set that includes a comparison of yearly revenues of two companies having differing fiscal year variants (a fiscal year variant defines a relationship between a calendar and fiscal year, where the fiscal year variant specifies the number of periods, special periods in a fiscal year, and how to determine assigned posting periods). The multi-dimensional set object 400 represents a four-dimensional set (i.e., a collection of objects in four dimensions) that includes the dimensions company, account, year, and month, in a specified order (i.e., the order of dimensions may be arbitrarily defined). The first company is referred to as company 0001 and the second company is referred to as company 0002; the accounts include account identifiers marked in the range of 800000 and 900000; the years include 2003 and 2004; and the months are represented by numbers ranging from 1 through 12. As an SQL statement, the set would be represented using the expression: (Company='0001' AND Year=2004 AND Month BETWEEN 1 AND 12 OR Company='0002' AND (Year=2003 AND Month BETWEEN 4 AND 12 OR Year=2004 AND Month BETWEEN 1 AND 3)) AND Account≧'800000' AND Account<'900000'.

A multi-dimensional set object, in general (i.e. where there exists more than one dimension in a model of a collection of objects), is either a Cartesian Product of two sets, or an ordered conjunction (i.e., a union) of sets. In FIG. 4, the multi-dimensional set object 400 is built from one-dimensional set objects (including the empty set and the universal set), and further includes Cartesian Products (e.g., in the form of Cartesian Product sets), and unions (e.g., in the form of union sets). Cartesian Product sets are Cartesian Products of a one-dimensional set and any other type of set that is not the universal set or the empty set (i.e., a Cartesian Product set object, another one-dimensional set, or a union set; however, the second set should not be the universal or empty set because the Cartesian Product set including that set would not be considered normalized). For example, a Cartesian Product set 405 contains a reference to a one-dimensional set 410 and a Cartesian Product set 415. Cartesian Product sets represent a set of all ordered pairs with the first element of each pair selected from a first set and the second element selected from a second set. Thus, the Cartesian Product set 405 is a set of ordered pairs of elements from the set represented by the one-dimensional set 410 and the Cartesian Product set 415. A Cartesian Product set is of the dimension type of the one-dimensional set to which it refers (the first one-dimensional set if there are two one-dimensional sets). Thus, in the example, the Cartesian Product set 405 corresponds to the dimension account, which is the dimension type of the one-dimensional set 410 to which the Cartesian Product set 405 refers. According to the normalization conditions for a Cartesian Product set, the first set (i.e., the one-dimensional set) should always be of lower order than the dimension of the second set. The data structure of a Cartesian Product set includes a list of two references to the sets from which a Cartesian Product is represented. For example, the Cartesian Product set 405 includes a list of two references to the one-dimensional set 410 and the Cartesian Product set 415.

A union set is a union of disjoint Cartesian Products. Each Cartesian Product consists of a block of a partition and another set (e.g., knot value 435 and a set referenced by reference 440 define a Cartesian Product). As defined in reference to the one-dimensional set, a partition is defined by a sorted vector of distinct knot values and is assigned to a dimension defined for the union set. In reference to the union set, knot values define a first set of each Cartesian Product. A second set of each Cartesian Product should be—for normalization reasons—of higher dimension order than the union set's dimension. Thus, a union set can include references to any type of set. For example, knot values in a union set 430 are in the dimension company, which is the dimension of the union set 430. A data structure of a union set includes a list of knot values and corresponding partition references. The data structure of a union set can be interpreted as a generalization of the data structure for the one-dimensional set object (i.e., a generalization of the class DimensionSet 310, discussed earlier), except the data structure may use a list of references as a partition set vector instead of a partition bit array, however, the list of references may be used similarly to a partition bit array (i.e., a reference can represent values above, at, or below a corresponding knot value).

The following model may be used to describe the representation of a multi-dimensional set object. It can be assumed that the multi-dimensional universal set U is a Cartesian Product of a set of one-dimensional universal sets $U_d$; in other words: $U := \times x_d U_d$ In that model, each dimension should be represented by a data type that can be ordered. For example, each dimension can be approximated in a computer system by an elementary data type, or a complex data if a complex data is can be ordered (i.e., an order can be defined among values represented by the data type; e.g., the elementary data type integer is ordered because the values of variables can be ordered, for example, in increasing number, such as 0, 1, 2, and so on). In addition, each dimension should be uniquely identifiable by, for example, a name. As an example, a column name of a relational database table may be used to uniquely identify a dimension.

The model may use a combination of one-dimensional sets to represent a multi-dimensional set. For example, the model may embed one-dimensional sets in a multi-dimensional set. A one-dimensional set $S_d$ belonging to a dimension d can be embedded in a multi-dimensional set according to the following:

$$S := \left( \underset{d'<d}{x} U_{d'} \right) x S_d x \left( \underset{d'>d}{x} U_{d'} \right).$$

In other words, a multi-dimensional set S should be representable as the Cartesian Product (represented by 'x' above) of (1) all one-dimensional universal sets $U_{d'}$ (i.e., one-dimensional universal sets that are dimensions other than the dimension represented by the one-dimensional set) greater or less than those dimensions represented by the set $S_d$, and (2) the set $S_d$.

To represent this property, values of a one-dimensional set can be stored, without explicitly storing all the universal sets of the other dimensions in the Cartesian Product, such that using the dimension information for the dimension defined by $U_d$ is a tacit understanding that all other universal sets are Cartesian Products of the one-dimensional set $S_d$.

To provide for completeness of representation for multi-dimensional sets, two additional types of sets, other than the one-dimensional set, may be used: a Cartesian Product set and a union set. A Cartesian Product set C can represent a simple Cartesian Product of a one-dimensional set D, referred to as a first Cartesian Factor, and an arbitrary set F (i.e., arbitrary in the sense it may be a one-dimensional set, or another type of set, such as a Cartesian Product set or a union set) which will be referred to as a second Cartesian Factor. The representation will store references of these two objects as private components C.D and C.F. For normalization of the Cartesian Product set, the components of a Cartesian Product set should fulfill the constraints:

$C.D.dim( ) < C.F.dim( )$, and $C.F \neq \emptyset \wedge C.F \neq U$, where CD.dim( ) represents the order of the dimension (i.e., whether a dimension is of a higher or lower order than another dimension; the order of dimensions may be defined arbitrarily or otherwise) of the Cartesian Factor D and CF.dim( ) represents the order of the dimension of the Cartesian Factor F, such that the order of the dimension of the Cartesian Factor D should be less than the order of the dimension of the Cartesian Factor F; and the Cartesian Factor F should not represent the empty set or the multi-dimensional universal set U.

The model of a Cartesian Product set may further include the definition of the dimensions of a Cartesian Product set and the definition of knot values and partition sets that represent the collection of objects of a Cartesian Product set. To define the dimension order of a Cartesian Product set, the dimension order of a Cartesian Product set C can be defined by the dimension order of its component D: $C.dim( ) := C.D.dim( )$.

The model of a Cartesian Product set may represent a collection of objects similarly to the representation provided by a one-dimensional set defined above, by using a collection of knot values and a partition set. The knot values of a Cartesian Product set may be defined by a vector of knot values represented by t and knot values may be retrieved by a method C.t( ). A partition set may be a vector of references to sets and values of partitions in the partition set may be retrieved by a method C.P( ). The knot values and the partition sets, respectively, may be defined in accordance with:

$C.t(i) := C.D.t(i)$, and $C.P(i) := C.D.P(i) \cap C.F$

In other words, the Cartesian Product set may inherit knot values from a one-dimensional set that represents the Cartesian Factor D, and a value of the partition set C.P(i) of a Cartesian Product set is the empty set if a corresponding bit C.D.p[i] (i.e., an i-th bit in the partition bit vector of the Cartesian Factor D) of the dimension set is "0", otherwise it is the Cartesian Factor C.F.

The size of a Cartesian Product set C may be defined by the size of its Cartesian Factor D (i.e., $C.size( ) := C.D.size( )$).

According to this model of the Cartesian Product set, arbitrary intersections of one-dimensional sets and Cartesian Product sets can be calculated and the result will be the empty set, a one-dimensional set, or a Cartesian Product set.

The model may further define a union set (with the set types introduced thus far it is not reasonably possible to represent the union of two arbitrary sets). An unnormalized representation of a union set U may be defined by a knot value collection U.t[ ] and a partition set collection S.P[ ]. The knot value collection may be a sorted array U.t[ ] of size n distinct values of the dimension's data type (i.e., U.t[i] being elements of T, as defined in the one-dimensional case). The partition set P[ ] may be a partition set array of size 2n+1, where n is the size of a set S (which may be retrieved by, for example, a method called S.size( )).

Like a one-dimensional set (defined as DimensionSet 310 above) a union set can be assigned to a dimension from which the knot values are taken from. As in the one-dimensional set, n distinct knot values define a partition on the dimension to which the union set is assigned. Each partition has 2n+1 elements called blocks. For each block, which is either a single-value (i.e., a knot) or an open interval (i.e., a link), a Cartesian Product with the corresponding set from the partition set array S.P[ ] is calculated and the union of the (per construction) pair-wise disjoint 2n+1 Cartesian Products define the union set.

Figure 5:
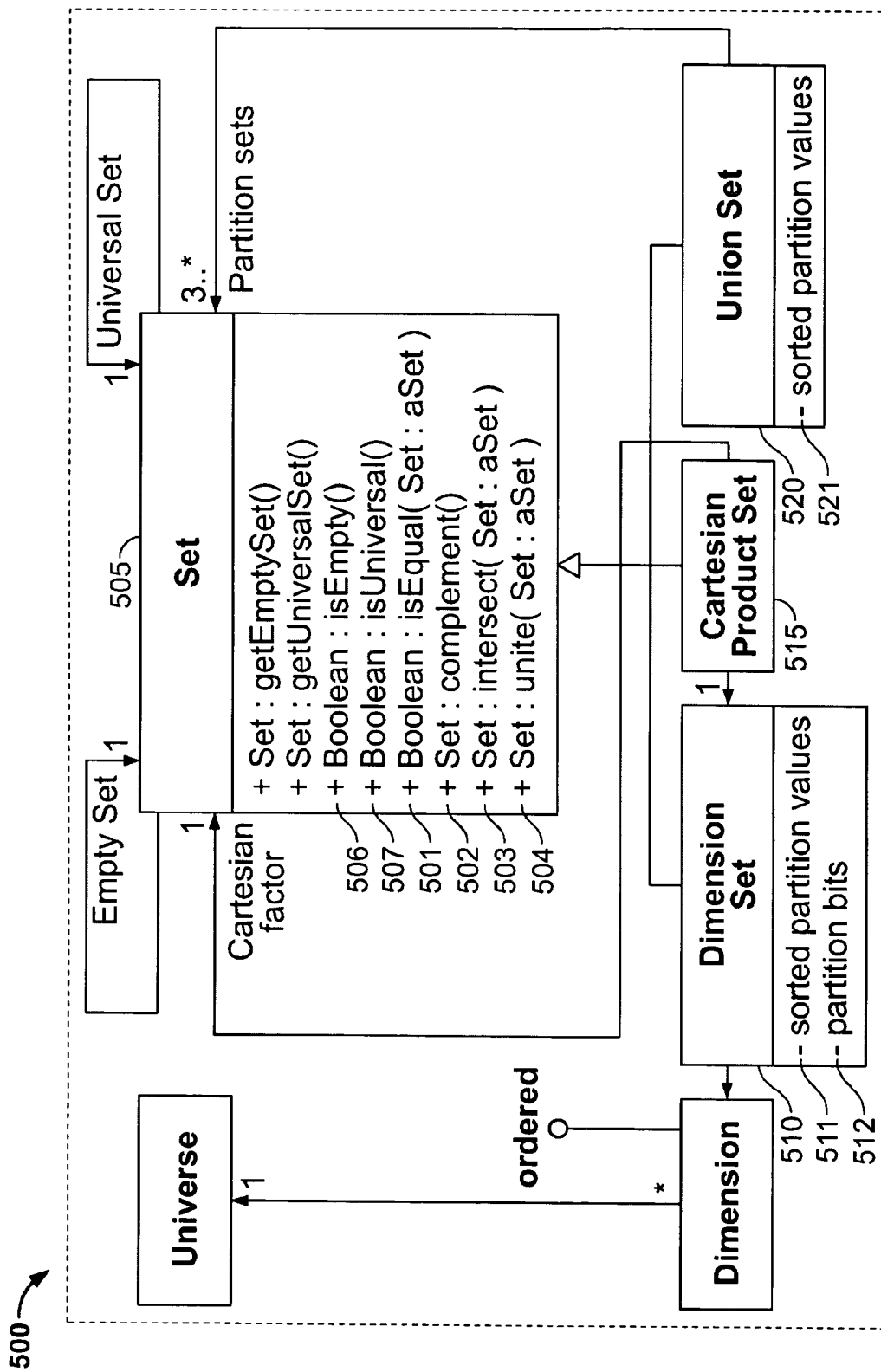
FIG. 5 illustrates a model for representing a set as a multi-dimensional set object.

FIG. 5 illustrates a model 500 for representing a set as a multi-dimensional set object. The model 500 is similar to a Unified Modeling Language (UML) diagram and provides examples of data structure definitions that can be used to generate a multi-dimensional set object in accordance with a model similar to the models discussed above. The model 500 includes a class Set 505, a class Dimension Set 510, a class Cartesian Product Set 515, and Union Set 520.

The classes Dimension Set 510, Cartesian Product Set 515, and Union Set 520 define a one-dimensional set object, a Cartesian Product set object, and a union set object, respectively. Each of these classes (510, 515, and 520) inherits the general class Set 505, which may be defined similarly to the class Set 105 described in reference to FIG. 1. The class Set 505 includes methods, such as the methods $is_{13}$ empty( ) 506 and is_universal( ) 507, which return a result indicating whether a set object is the empty set or the universal set, respectively. The class Set 505 further includes methods for basic set operations such as the methods is_equal( ) 501, complement( ) 502, intersect( ) 503, and unite( ) 504, which correspond to the basic set operations of equality, complement, intersection and union. Those methods may be defined as method stubs in the class Set 505, and may be implemented by the classes that inherit the class Set 505. For example, if the methods should be defined differently depending on the type of set object, the methods might be defined as stubs in set 505 and might be defined for each class that defines a set object. The method is_equal( ) 501 returns a boolean value representing whether a first set object from which the method is called, and a second set object that is passed as an argument, are equal. The method complement( ) 502 calculates the complement of the set object that calls the method. The method intersect( ) 503 calculates the intersection of a first set object from which the method is called, and a second set object that is passed as an argument. The method unite( ) 504 calculates the union of a first set object from which the method is called, and a second set object that is passed as an argument.

As mentioned earlier, each of the classes Dimension Set 510, Cartesian Product Set 515, and Union Set 520 define a different type of set object. The class Dimension Set 510 defines a one-dimensional set object that includes a sorted vector 511 of partition values (i.e., a vector of knot values), and a vector 512 of partition bits. In combination, the vectors 511 and 512 can represent a collection of objects in a one-dimensional space.

The class Cartesian Product Set 515 defines a Cartesian Product of two set objects, a first set being a one-dimensional set object (a first Cartesian Factor) and the second set being a set object (a second Cartesian Factor) that is not the universal set or the empty set (e.g., a union set, a Cartesian Product set, or a one-dimensional set). Although not shown, the class Cartesian Product Set 515 may include two reference variables (e.g., pointers), one for each Cartesian Factor.

The class Union Set 520 represents a disjoint union of any type of set objects. To represent this, the class defines a union set object to include a vector of knot values 521 and a vector (not shown) of references to set objects that correspond to ranges above or below a knot value, or include a knot value.

A model of a one-dimensional set, a two dimensional set and an n-dimension multi-dimensional set can include several different types of set objects, including: an empty set object, a universal set object, a one-dimensional set object, a Cartesian Product set object, and/or a union set object. A one-dimensional universal set (which can be an ordered list of distinct values, which might be also be tuples if an order for these tuples is defined) can be defined with reference to the first three types of set objects (i.e., the empty set object, the universal set object, and one-dimensional sets having a sorted array of distinct values from a subset (all technically representable values) of the universal set and a normalized partition bit array (see normalization conditions for one-dimensional sets).

In a two-dimensional universal set (i.e. the set of all ordered pairs (2-tuples) where a first component is an element of a first universal set that belongs to a first dimension and a second component is an element of a second universal set which belongs to a second dimension) the following set objects can exist and describe the model: an empty set object; a universal set object; one-dimensional set objects belonging to the first dimension (see the description of how a one-dimensional set can be embedded in a multi-dimensional space by adding a reference to a dimension abstraction); one-dimensional set objects belonging to the second dimension (i.e., one-dimensional set objects that define the second dimension and can be defined by a same data structure as the one-dimensional set objects that define the first dimension), Cartesian Product set objects having a one-dimensional set object of the first dimension as a first Cartesian factor and a one-dimensional set object of a second dimension as a second Cartesian factor; and union set objects. The Cartesian Product set objects might all belong to the first dimension per each construction. In a two-dimensional space no normalized Cartesian Product set objects might exist that belong to the second dimension. This can be true because normalization conditions can define that the dimensions have to be ordered in a Cartesian Product set object and that the second Cartesian factor must not be a reference to the empty set object or the universal set object. Union set objects can define all other set objects belonging to the first dimension (i.e. having knot values from the first universal set and a partition set array which consists of references to the empty set object, to the universal set object, and/or to one-dimensional set objects of the second dimension; for normalization reasons there can be at least one reference to a one-dimensional set object in the partition set array).

An n-dimensional universal set might be defined as the Cartesian Product of a (one-dimensional) universal set (referred to as the first dimension) with a (n−1)-dimensional universal set (referring to the second up to the n-th dimension) having the following set objects: an empty set object; a universal set object; (n−1)-dimensional set objects from the 2nd to the n-th dimension (excluding trivial set objects such as the union set object and the empty set object); Cartesian Product set objects that can be built by combinations of a one-dimensional set object belonging the first dimension as the first Cartesian factor and non-trivial (n−1)-dimensional set objects belonging to the 2nd up to the n-th dimension as the second Cartesian factor; and union set objects belonging to the first dimension having a sorted knot value array of distinct knot values from a subset of the first universal set and having all combinations of all (n−1)-dimensional set objects belonging to the second up to the n-th dimension, where the empty set object and the universal set object can be elements of the partition set array. As in the two-dimensional case, there can be at least one reference to a non-trivial set object in the partition set array for normalization reasons; otherwise the set object is not regarded as normalized and may be converted to an equivalent one-dimensional set object belonging to the first dimension.

Although the model 500 includes a certain definition of classes, variables, and methods, alternative implementations may include additional and/or different classes, variables, and/or methods.

Normalized Sets: Overview

Both one-dimensional sets and multi-dimensional sets can be normalized. Normalization should ensure that whenever two representations represent the same set within $M_d$ (i.e., one dimension of a closed subset, of a power set of U, that is represented by a data structure) that their representations are equal. In other words, two data structures that are supposed to represent a same set should have the same representation. A representation of a set S can be defined to be a normalized representation if the following constraints are true (where each N in parenthesis represents a normalization rule):

(N1) The boolean expression (S.p[2i]=S.p[2i−1])∧(S.p[2i]=Sp[2i+1]) is false for all i between 1 and S.size( ).

(N2) Two subsequent elements of S.t[ ] are distinct. I.e., S.t[i]<St[i+1] is true for all i between 1 and S.size( )−1.

(N3) There must exist at least one knot value. I.e., S.size( )>0 must be true.

Where, S.p[ ] represents a partition vector as described earlier, S.t[ ] represents a knot vector as described earlier, and S.size( ) is a method representing the size of the knot vector of the set S.

If the first constraint (N1) or the second constraint (N2) is not fulfilled a knot is redundant. To normalize such a set, all redundant knots can be removed from a representation (e.g., a data structure) of the set S. If the third constraint (N3) does not hold, a set S can be normalized by replacing the set S with the empty set (i.e., Set.EmptySet) if S.p[1]=0 and by the universal set (i.e., Set. UniversalSet) otherwise. Normalization constraints (N1), (N2), and (N3) may be referred to as, in combination, "standard normalization".

Beyond standard normalization, normalization conditions could be enforced depending on further properties of $U=U_d$ which may include (O1) through (O3), which are defined as follows:

(O1) The minimum element of T (if it exists) is also a minimum element of U: $\forall$ u ∈ U(u≧min(T));

(O2) The maximum element of T (if it exists) is also a maximum element of U: $\forall$ u ∈ U (u≦max(T));

(O3) Each element of U has either a unique successor (predecessor) or is (if exists) the maximum (minimum) element of U: $\forall$ u ∈ U ¬(∃$u_{succ}$ ∈ U ($\forall$v∈U(u≦v≦$u_{succ}$⇒v=u ∨ v=$u_{succ}$))⇔$\forall$ v∈ U(v≦u)); and T must be a well-ordered subset of U.

Satisfying further normalization assists in performing basic set operations that will be described later. Depending on a data type that represents a universal set $U_d$, any number of the conditions may be followed and further normalization may be satisfied. As examples, Table 1 describes types of universal sets in the first column, corresponding data types in the second column, and corresponding normalization conditions that may be required such that a set is further normalized for purposes of the set operations described later. The data types described in Table 1 are for the ABAP programming language and may differ depending on the programming language.

TABLE 1

| Universal Set U | Data type T | Normalization properties |
|---|---|---|
| Real Numbers ℜ | Double- or single-precision float, (binary coded decimal) BCDs | [none] |
| Integer numbers ℑ | Integer (1 byte, 2 byte, . . . ); BCDs without decimals | (O3) |
| Natural numbers $\aleph_0$ | Numeric characters | (O1) ∧(O3) |
| Date values since 0001-01-01 including initial value 0000-00-00 | All date values less or equal 9999-12-31 | (O1) ∧(O3) |
| Strings | Strings | (O1) |
| Set with a finite number of elements | Time of a day (in hours, minutes, and seconds) | (O1) ∧(O2) ∧(O3) |

To uniquely represent an arbitrary set, in a multi-dimensional set environment (i.e., where the universal set has multiple dimensions), as either the empty set, the universal set, a dimension set (i.e., a one-dimensional set), a Cartesian Product set, or a union set, normalization conditions may be defined. In a multi-dimensional set environment, one-dimensional sets may follow the normalization conditions discussed above. For a union set U of size n, the normalization conditions may include the following conditions (N1) through (N5):

(N1) For the partition sets the condition:

$U.P[2i].isEqual(U.P[2i-1])=true \land U.P[2i].isEqual(U.P[2i+1])=true$, must be false for every knot (i=1 . . . n), where n is the size of the set U and the method isEqual( ) determines whether a partition set is equal to another partition set. In other words, no 2i-th partition sets can be equal to each (2i−1)-th partition set, where a 2i-th partition set is equal to a (2i+1)-th partition set. If the N1 condition is not fulfilled for the i-th knot, the i-th knot is redundant and can be removed, as was discussed in the one-dimensional case.

(N2) Two subsequent elements of the knot value array U.t[ ] should be distinct (i.e., U.t[i]<U t[i+1] is true for all i between 1 and n−1, where n is the size of the set U).

(N3) There should exist at least one knot (i.e., n>0 must be true). If a knot does not exist (i.e., if n=0), U could be replaced by a solely remaining partition set U.P(1) (i.e., this could be any set which belongs to a dimension of higher order).

(N4) Every partition set should belong to a "higher" dimension than the dimension of the union set. In other words, U.dim( )<U.P[i].dim( ) must be fulfilled for all i between 1 and 2n+1, where n is the size of the set U and the dimensions of all sets in the multi-dimensional model are ordered.

(N5) The logical expression:

$\exists i, j (1 \leq i \leq 2n+1 \wedge 1 \leq j \leq 2n+1 \wedge U.P[i] \neq \emptyset \wedge U.P[j] \neq \emptyset \wedge \neg U.P[i]isEqual(U.P[j])$ must be true. In other words, all partition sets in the set U that are not the empty set should not be equal all together. If this condition is false, a non-empty set can be factored out from the array of partition sets and the whole set U can be either represented as a Cartesian Product set (if the factor is not the universal set) or a dimension set (if the factor is the universal set). In either case, the knot array should be the same as the knot array of the unnormalized union set and a partition bit array should be derived from the partition set array U.P[ ] by setting a bit to "0" for every empty set and a bit to "1" otherwise.

To uniquely represent sets in a multi-dimensional set environment, general normalization conditions may apply. In general, normalized sets in a multi-dimensional set environment include the empty set, the universal set, a one-dimensional set, a Cartesian Product set, or a union set. Although these different set types have different attributes, common normalization conditions should include (N1) through (N4) as follows.

(N1) Each set should be uniquely assigned to a dimension. To follow this condition, the empty set and the universal set may be assigned to an artificial dimension of infinite order; one-dimensional sets and union sets may be explicitly assigned to a dimension (i.e., a dimension to which knot values belong is an explicit attribute of this kind); and a dimension of a Cartesian Product set may be derived from the dimension of its first Cartesian Factor (which may be defined to be always a one-dimensional set).

(N2) Each set has a sorted collection of unique knot values belonging to the set's dimension. Under that condition, the empty set and the universal set may have an empty knot value collection; one-dimensional sets and union sets may have an explicit knot value array; and, the knot value collection of a Cartesian Product set may be the knot value array of its first Cartesian Factor.

(N3) Each set has a size. The size should be the number of knot values.

(N4) Each set has an indexed collection of partition sets. Under that condition, the size of the partition set collection is always two times the number of the knot values plus 1 (i.e., 2n+1). For the empty set and the universal set there may exist only one partition set, which is the set itself. For a one-dimensional set, the partition set at index i may be the empty set if the bit at index i of its partition bit array is 0, and the partition set at index i may be the universal set otherwise. For a Cartesian Product set, the partition set at index i may be the empty set if the bit at index i of the partition bit array of its first Cartesian Factor is 0, and the partition set at index i may be the second Cartesian Factor otherwise.

Extended Normalization of Set Objects

As discussed above, when representing a collection of objects in a computer, as a set, two set objects may represent the identical collection of objects, but they may have different representations (e.g., by not being set objects that contain the same values, such as knot values in a one-dimensional set object). For example, for a universal set being the set of all integers, the sets i<4 and i≦3 ate the same (as they include the same integers); however, the different expressions may result in different set objects. Following that example, a first set object representing the first expression may have a knot array having a single knot value of 4 and a partition vector that indicates elements below four, but not including 4, and the numbers above four are in the set object (e.g., 1, 0, 0). In contrast to that representation, a second set object representing the second expression may have a knot array with the knot value 3 and a partition vector indicating that the numbers below 3 and at 3 are in the set object, but not the numbers above 3 (e.g., 1, 1, 0).

Although normalization of set objects need not be performed and a certain amount of non-uniqueness may be acceptable, having a degree of consistency across set objects representing a same collection of objects may be desirable. Thus, in addition to, or instead of, any of the standard normalizations discussed above, other types of normalization, also referred to as "extended" normalization, may be performed. The extended normalization may take into account scenarios not covered by standard normalization such that consistency is ensured across set objects that represent a same collection of objects for those scenarios (e.g., a consistent representation of consecutive, uninterrupted sequences of values). The extended normalization may assist in implementing operations on set objects and those operations may result in consistent results (e.g., operations on multiple set objects representing a same collection of objects would have consistent results). For example, if an operation that determined whether two set objects were identical was to be implemented, an implementation might include iterating through the knot values and partition values, one-by-one, in a simple fashion, to see if the representations are the same. However, if the representations differ such that the set objects differ, implementing the operation might be much more complex, or have inaccurate results (e.g., a result determining that two set objects are not equal, although their corresponding collection of objects is identical).

Figure 11A:
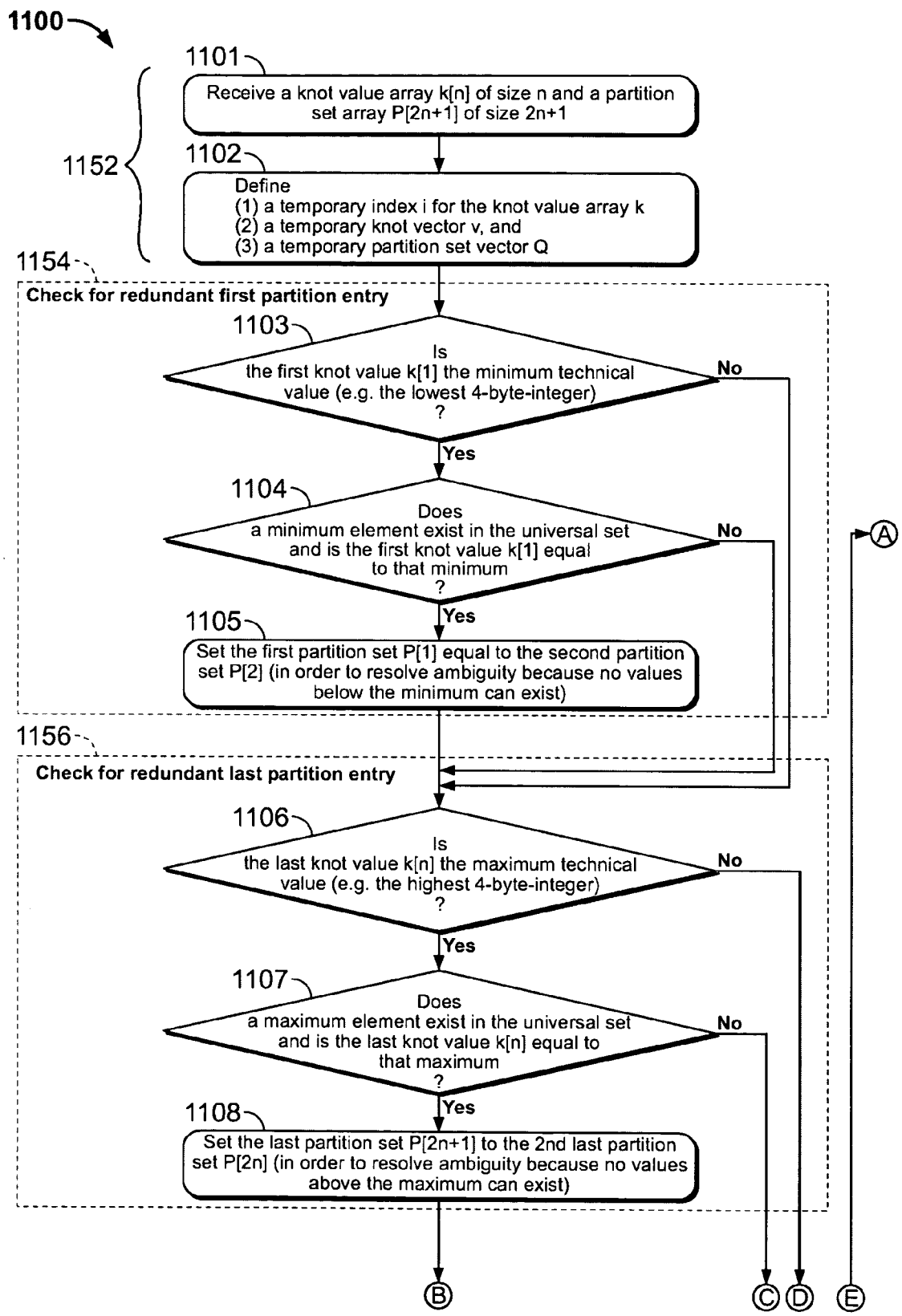
FIGS. 11A-11E include a flow chart of a process of normalizing a set object.
Figure 11B:
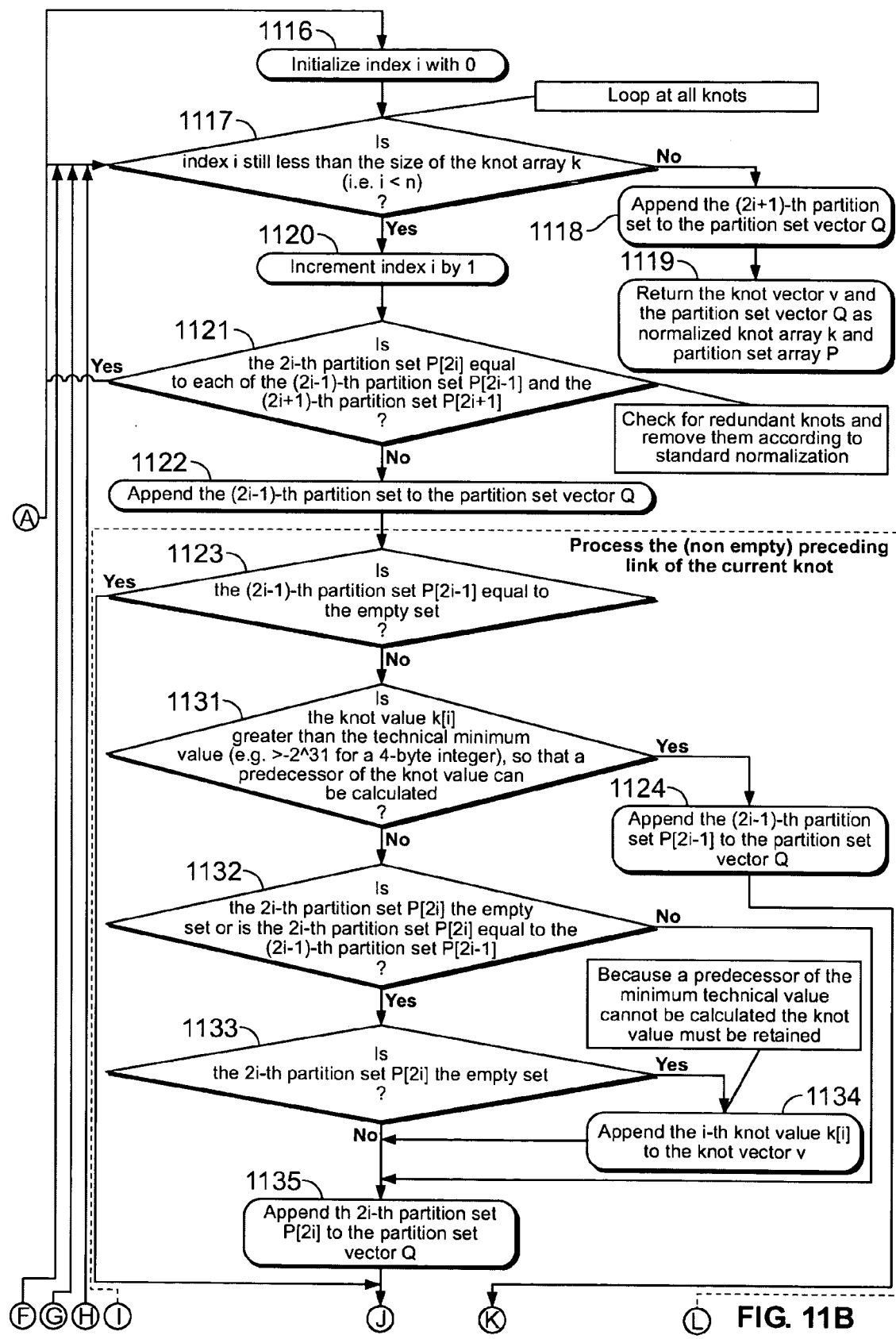
Figure 11C:
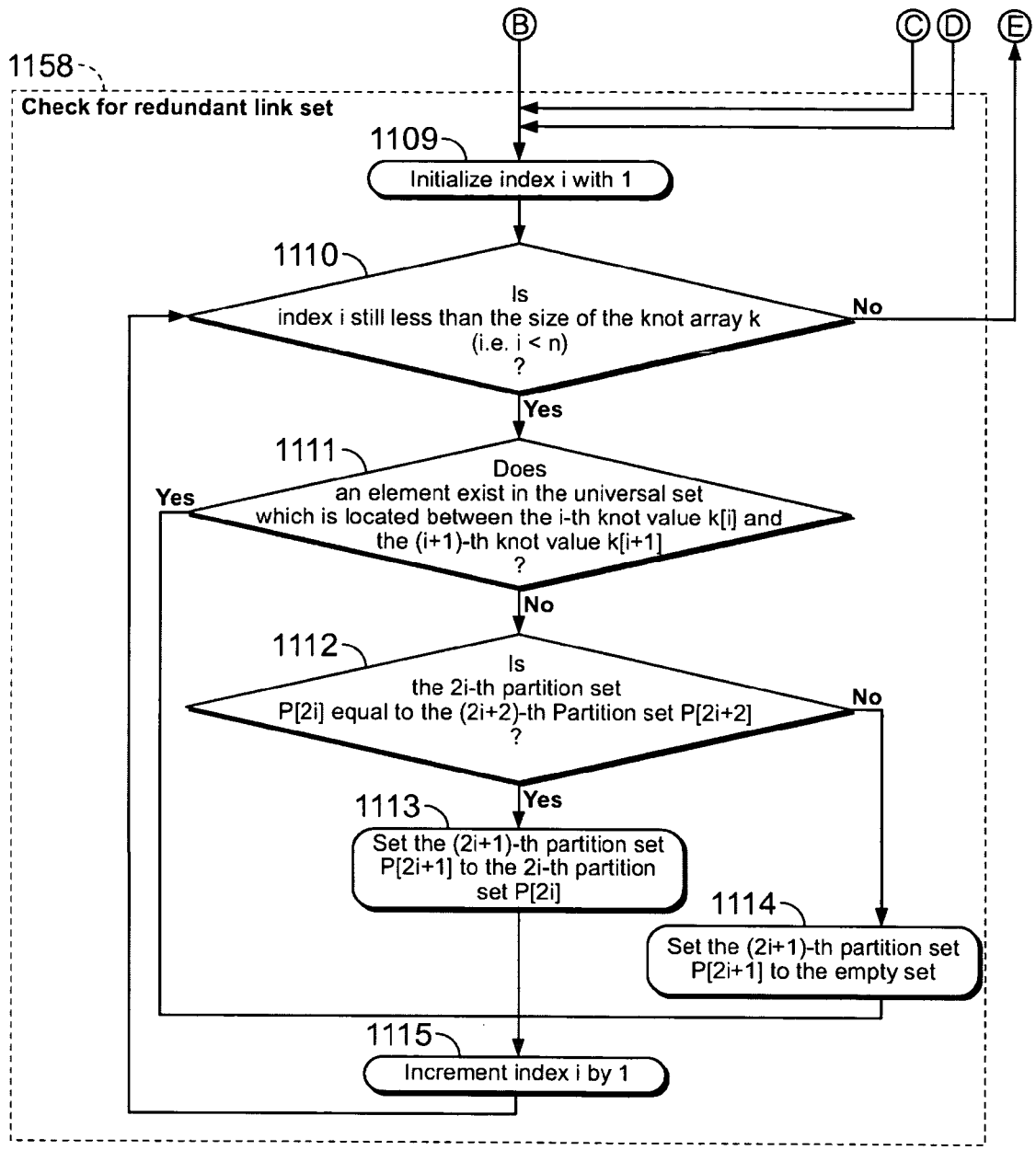
Figure 11D:
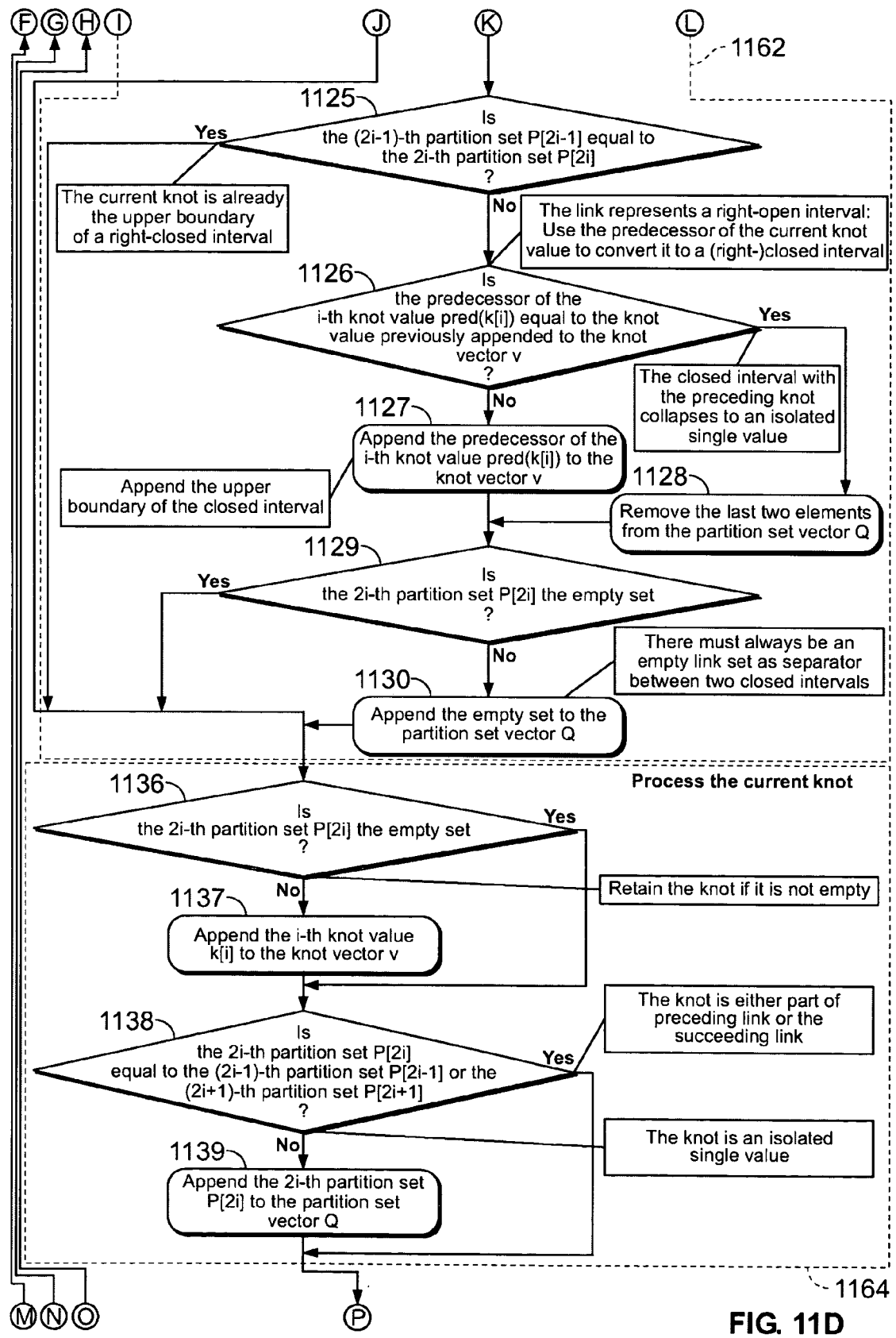
Figure 11E:
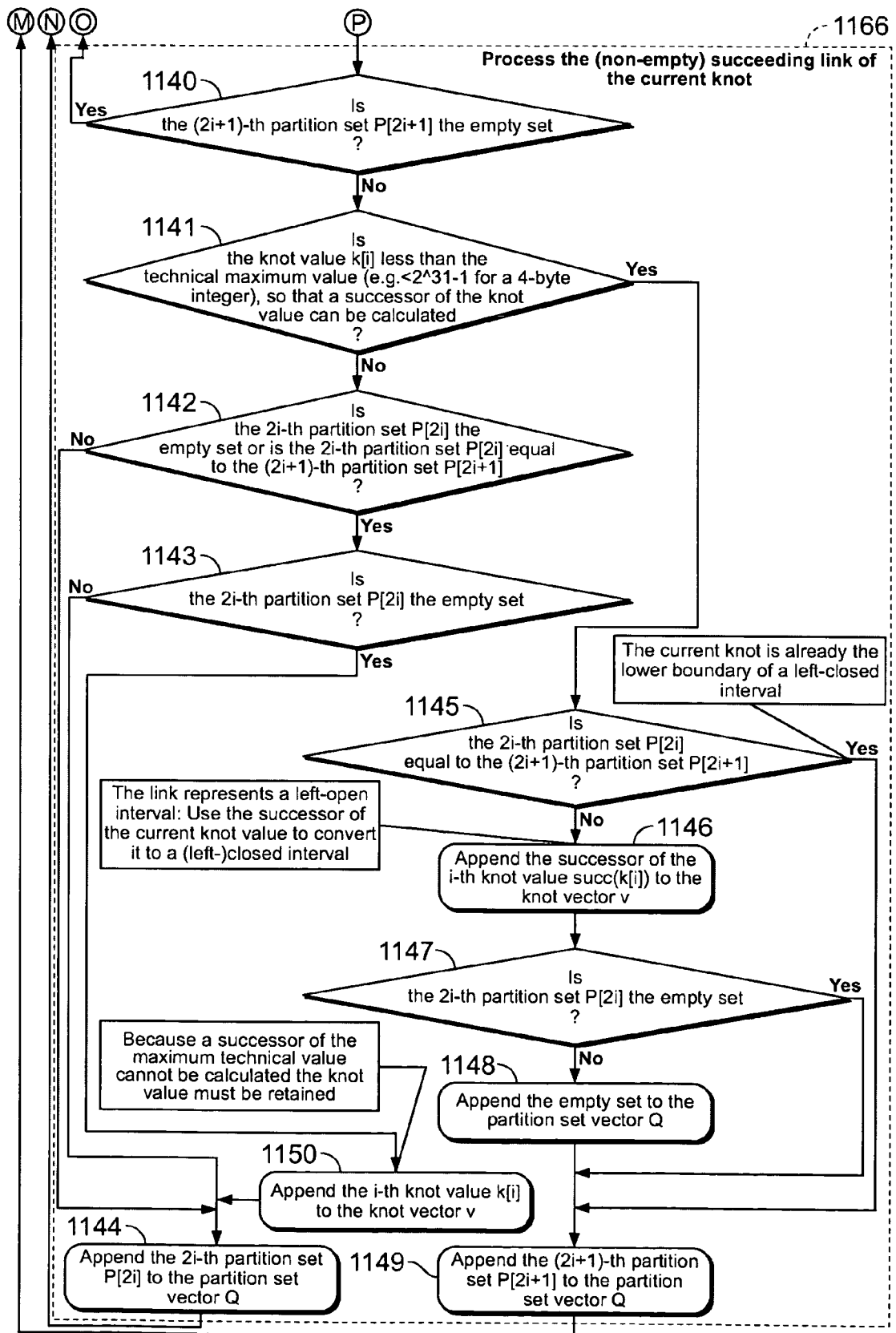

FIGS. 11-11E include a flow chart 1100 of a process of normalizing a set object. The process of the flow chart 1100 can be used to generate a normalized union set (that is in accordance with the model of a multi-dimensional set object described above); however, the process can be modified to generate a normalized one-dimensional set object (such as the one-dimensional set objects described above) and the process can be modified for other implementations of a union set object. As an example, an implementation for a one-dimensional set object may be deduced by replacing "partition set" with "partition bit" and "empty set" with "bit 0." Although specific terms are used in the flow chart 1100 that describe implementations relating to normalizing a multi-dimensional set object, broader terms can be used that include additional implementations. For example, the partition set may be described as a partition entry or partition element, either of which can include partition sets and partition bits. As another example, a knot value may be described as a knot element or value (e.g., a minimum knot value could be a minimum value of a set object).

The flow chart 1100 includes different sub-processes that perform different types of normalization and related tasks. In general, the different sub-processes involve setting-up a system to generate a normalized set object (1152); normalizing a first element (first in terms of ordering) of a partition vector (1154); normalizing a last element of the partition vector (1156); normalizing links, of a partition vector, that represent intervals between knot elements by removing redundant links (1158); normalizing redundant knots of a partition vector (1117, 1120, 1121); normalizing intervals by replacing open intervals with closed intervals (1162, 1164, 1166); and returning a normalized set object (1119).

Setting-up a system (e.g., a computer) to generate a normalized set object (1152) involves receiving a set object to normalize (1101) and defining temporary variables (1102). In the flow chart 1100, a multi-dimensional set object is structured similarly to the multi-dimensional set objects discussed above; thus, receiving the set object can involve receiving a vector of knot values k[n] of size n and a partition set array P[2n+1] of size 2n+1 (e.g., a partition vector) (1101). Temporary variables that are set-up include a temporary index i that is used to iterate through the knot value array k, and a temporary knot vector v and a temporary partition set vector Q, which are used to return a normalized set object (1119). The temporary variables for the knot vector and partition vector are used to generate a normalized set object by including a selection of elements from the received set object in the temporary variables, and returning those temporary variables as the normalized set object.

A first element (first in the sense of ordering) of a partition vector is normalized because there can be an ambiguity for a first partition set (which defines the inclusion or exclusion of all values less than a first knot value). This can occur if a first knot value is equal to the technical minimum value and the technical value is also the minimum value of the universal set (U) that can be represented by the technical data type (T). In the case that those conditions are true, the set {u in U|u<min (T)} would be the empty set. Thus, rather than having multiple set objects represent an empty set differently, normalizing a first partition set to an empty set may be advantageous.

For example, were U would be the (infinite) set of all integer numbers and T the set of all 4-byte integer numbers, the minimum of T may be $-2^{31}(-2147483648)$. For a set S such that {u in U|u>=−2147483648}, S would not be the universal set, although there are no values in T which are not in S. Thus, an ambiguity may occur and it might be desirable to distinguish S from the universal set. As an example in a system using one-dimensional set objects, such as the one-dimensional set objects discussed above, an unnormalized representation of S may be defined by a knot array of size 1 containing the minimum technical value (−2147483648) and the partition bit array (0, 1, 1) of size 3. Normalizing the first element of the set object need not involve modifying this representation so the collection of objects defined by the set object may be normalized simply by ensuring the representation has a certain degree of uniqueness.

As another example, were U to be a set of all natural numbers (including '0') and T a set of all unsigned 1-byte integers, the minimum of T may be '0' which is also the minimum of U. In this example, the set S might be defined such that {u in U|u=>0} is equal to the universal set. Thus, an unnormalized representation of S might be defined by a knot array (0) of size 1, which contains the minimum technical value and a partition bit array (0,1,1) of size 3. The first partition bit might represent the set {u in U|u<0}, which is equal to the empty set. Thus, the first partition bit might be redundant. To resolve the ambiguity, a partition bit could be set as the same value as the second partition bit. Following the example, this would result in a partition bit array (1, 1, 1). According to the standard normalization conditions, a redundant knot can be indicated and that redundancy might be removed. Were the only knot value to be removed, an empty knot value array might remain and a bit array (1) of size 1 might result. That could represent the universal set, such that, the example would be normalized to the universal set.

Referring back to the flow chart 1100, normalizing a partition set of a partition vector (1154) involves determining whether a first knot value k[1] is a minimum technical value (1103). The minimum "technical value" refers to the minimum value representable by a computer system, or, rather, chosen to be supported for a data type that corresponds to a knot value. For example, if a knot value is of a data type of 4-byte-integer, the minimum technical value supported might be −2147483648.

If the first element is a minimum technical value, a determination is made as to whether a minimum value of the universal set is the same as the minimum knot value (e.g., the first knot value k[1]) (1104), the first partition set P[1] is set to the second partition set P[2] (in order to resolve ambiguity because no values below the minimum can exist) (1105).

If the first knot value is not a minimum technical value or the first knot value is not the same as the minimum value of the universal set, the set object is not modified, and the set object is considered normalized with respect to an ambiguity that can occur with the first element of the set object.

Normalizing a last partition set (1156) involves similar sub-processes. Normalizing the last partition set involves determining whether the last knot value k[n] is the maximum technical value (e.g. the highest 4-byte-integer) (1106), and determining whether a maximum value exists in the universal set and the last knot value k[n] is equal to that maximum value (1107). If either of those determinations has a negative result (e.g., "no"), the set object is not changed and the last partition set is considered normalized. If both of those determinations has a positive result (e.g., "yes"), the last partition set P[2n+1] is set to the penultimate partition set P[2n] (in order to resolve ambiguity because no values above the maximum can exist) (1108).

Normalizing redundant links (1158), involves iterating through the set object and removing redundant links. The set object is iterated through by initializing the index i (1109), ensuring the index is less than the maximum size of the knot array (1110), and incrementing the index (1115). In each iteration, a determination is made as to whether a value in the universal set exists between two consecutive knot values (1111). If there is a value, the sub-process of iterating continues (1115, 1110). Otherwise, a determination is made as to whether two consecutive knot values are in the collection of objects defined by the set object (1112) (e.g., if they have a same partition set).

If the knot values are in the in the collection of objects, the succeeding partition set is set to the current partition set (1113), which can ensure that a link reflects that two knot values are consecutive. Otherwise, the succeeding partition set is set to the empty set (1114), which can ensure that a link does not exist between consecutive knot values (e.g., where the number two is in a set of integers and the number three is not in that set of integers, there should not be a link between the knot values because no number can exist between the those numbers).

The standard normalization discussed above assumes that, for every two knot values, there always exists an element of U which is located between the two knot values, even if the second knot value is the direct successor of a first knot vector according to the technical data type. However, if no element of U exists between two successive knot values, the link bit between two knots can be considered redundant (as it is a redundant representation of the consecutive nature of the knot values). Ambiguity may be removed by deriving a link value from two surrounding partition entries: If the surrounding partition entries are both equal, the link would be set to either of them; otherwise, the link entry would be set to the empty set.

As an example (using one-dimensional set objects; e.g., in accordance with the substitution of partition entries with partition bits, and the like discussed above and the example one-dimensional set objects discussed above), were U to be the set of all integer numbers and T the set of all 4-byte integers, a representation of the set S {u in U|u>2 and u<=3} could be defined by the knot array (2, 3) of size 2 and the partition bit array (0, 0, 1, 1, 0). In that example, the third partition bit 1 can describe the link between the first and the second knot value. Because there exists no value in U which belongs to this link, this partition bit is considered redundant. Thus, a normalized bit value may be derived from the two surrounding partition bits corresponding to values above and below the knot value. If the surrounding partition bits are both equal to 1, the link bit will be also set to 1; otherwise, the link will be set to 0. In the example, this can lead to the partition bit array (0, 0, 0, 1, 0). According to the standard normalization condition, the first knot value is redundant such that the knot value can be removed. Thus, standard normalization would represent the collection of objects as a knot array (3) of size 1 and a partition bit array (0, 1, 0). This is also the representation of the set {u in U|u=3} which is equal (at least for integer numbers) to S.

The remaining sub-processes (1116 through 1149) in the flow chart 1100 are performed during another iteration through the set object. Some of the remaining sub-processes relate to iterating through the loop (1116, 1117, 1120) and some relate to returning a normalized set object (1118, 1119). In general, the remaining sub processes in the flow chart 1100 normalize the representation of intervals of a collection of objects. Intervals refer to open intervals and closed intervals, whether half-closed/half-open or not. As examples, the relationships greater-than, less-than, greater-or-equal-to, and less-than-or-equal-to (e.g., '>', '<', '≧', '≦'), denote intervals.

In general, intervals are normalized in the flow chart 1100 by substituting right or left half-open intervals with right or left half-closed intervals, respectively (e.g., for a universal set object including all integers, modifying a set object representing the expression x≧3 to represent the expression x>2). This process may reduce ambiguity between representations of intervals (half-open and open intervals) for an uninterrupted sequence of consecutively ordered objects (e.g., consecutively ordered integers). For index values corresponding to a knot value (except for an index value equivalent to the size n of the knot array k), the sub-processes of normalizing intervals in the flow chart 1100 involve removing redundant knot values (1117, 1120, 1121), processing a preceding partition set (1162), processing a current partition set (1164), and processing a succeeding partition set (1166), where the partition sets are preceding, current, and succeeding with respect to the partition set corresponding to the index value (e.g., for the knot vector k[n], where i is the index, the partition set for P[2i] would be the current partition set).

Normalizing a set object may also be important to improve the extensibility of a system (e.g., the ability to upgrade data to a new data type that offers a greater range of values and ensure results of operations are consistent across upgraded and non-upgraded data). For example, for a dimension D that is built with a decimal data type with five digits and two decimal places, the technical minimum and maximum values may be −999.99 and +999.99, respectively. If a set object is generated based on an expression d>=−999.99, and that set object is not normalized according to the extended normalization, that set object could include all values of the data type. Thus, the generated set object may have the same representation as a universal set object. However, if the dimension were to be extended such that the number of digits were increased (e.g., to six decimals), ambiguity between the representations of the generated set object and the universal set object might be resolved. Because of the inconsistent ambiguity across different data types, inconsistent results could be computed when performing operations on set objects across the same data (e.g., different results could be computed when operations are performed on the five digit set object and the six digit set object). However, were the set objects to be normalized in accordance with the extended normalization, the set object in the five digit data type might not have an equivalent representation as a universal set object, such that transferring the same data to a system using the six decimal data type could have representations that allow for consistent results when operations are performed on those set objects. Thus, normalization can have a relationship to the extensibility of a system. As an example, a set object representing an open interval defined by an expression d>0.00 and d<0.01 might not include any value of a data type (e.g., a decimal data type having two decimal places such that no value exists between 0.00 and 0.01). However, if the data type were to be extended such that the number of decimals were increased (e.g., from two decimal places to three decimal places), the set object could be uniquely represented with respect to an empty set object (e.g., as the set object would include a value, such as 0.001).

Redundant knot values are removed by determining whether a current partition set is the same as a preceding and succeeding partition set (1121). If that is the case, the index value is increased (1117), which effectively drops a corresponding knot value from the normalized set object that is returned (1119). Otherwise, the knot value is not considered redundant, and the process of normalizing the current knot value continues with processing the preceding partition set (1123).

If the preceding partition set is equivalent to the empty set, the process of normalizing the set object continues with processing the current partition set (1164). Otherwise, a determination is made as to whether a predecessor of the current knot value can be calculated (1131). such that a preceding knot value could be represented by a data type corresponding to the knot value. If the value can be calculated, the preceding partition set is added to a temporary partition vector (1124), and a determination is made as to whether the preceding partition set in combination with the current partition set represent a right-open interval (e.g., being a half-open interval that is part of a half-open or open interval with the right being open) (1125). If the preceding partition set in combination with the current partition set represent a right-open interval, the right-open interval is converted to a right-closed interval (1126, 1127, 1128, 1129, 1130); otherwise, the preceding partition set is considered normalized with respect to open intervals, so the process continues with processing the current knot (1136). A right-open interval is converted to a right closed interval by determining whether the predecessor of the current knot value (e.g., predecessor in the universal set object) is the same as the previous knot value that is to be in the normalized set object (e.g., k[i−1], or, k[i−2] if the previous knot value was not to be included in the normalized set object) (1126); and, collapsing the partition sets for the current knot value if the predecessor of the current knot value is the same (1128), or, otherwise, converting the value that precedes the current knot value in the normalized set object (1127). Also, as part of converting a right-open interval to a right-closed interval, if a current partition set is not the empty set, the empty set is inserted in the normalized set object that is to be generated (1129, 1130), to ensure a buffer between closed intervals.

Processing the current knot value (1164) involves normalizing the set object such that the current knot value is to be included if, the current value corresponds to an isolated value with empty preceding and succeeding links (e.g., x=4), the current knot value is the upper boundary of a right-closed interval, or the current knot value is the lower boundary of a left-closed interval. To do this, the current knot value is retained if it is non-empty (1136, 1137); otherwise, the current knot value is effectively removed by not including it in the normalized set object that is to be generated (1136, 1138), which effectively removes a knot that is an upper bound of a right-open interval or a lower bound of a left-closed interval. Then, if the current partition set is not equivalent to either the preceding or succeeding partition sets, the current partition set is retained, as the current knot is an isolated value (1138, 1139).

Processing of the succeeding partition set (1166) is similar to processing the preceding partition set (1162). If the succeeding partition set is determined to be an empty set, the process of iterating through the set object continues (1140, 1117). Otherwise, there is a check to determine whether the knot value is less than the technical maximum value of the data type of the knot value (1141) (such that a successor of the knot value can be calculated).

If the knot value is not less than the technical maximum, and the current partition set is not the empty set or equal to the succeeding partition set, the current partition set is retained (1142, 1144). If the knot value is not less than the technical maximum, and the partition set is the empty set, the current knot value and the corresponding partition set are retained (1143, 1150). If the knot value is not less than the technical maximum, the partition set is not the empty set, and the partition set is equivalent to the succeeding partition set, the partition set is retained (1143, 1142).

Were the current knot value to be less than the technical maximum, a check is made to determine whether the current and succeeding partition set represent a left-open interval (1145). If the combination of the current and succeeding partition set represent a left-open interval, the left-open interval is converted to a left-closed interval by retaining a succeeding knot value of the universal set instead of the current knot value of the set object (1146), and, inserting the empty set into the partition sets if the current partition set is not the empty set (1147, 1148). In either the case that the current and succeeding partition sets represented a left-open interval or a left-closed interval, the succeeding partition set is retained (1149).

When process of normalizing the intervals has iterated through the set object (by going through all but the last element of the set object), the last partition set is retained (1118) and a normalized set object is returned (1119).

As discussed above, an altered version of the flow chart 1100 could be used to generate a normalized one-dimensional set object. In any case, the flow chart 1100 could be more generally described as involving, normalizing a minimum value of the set object (1152), normalizing a maximum value of the set object (1154), normalizing consecutively-ordered elements of the set object (1158), and normalizing intervals in the set object (1162, 1164, 1166). In alternative implementations, the sub-processes of how the different types of normalizations are performed can vary.

Although the flow chart 1100 uses terminology that appears limited to multi-dimensional set objects in accordance with the models discussed above, that need not be the case. For example, a minimum value of a set object need not be a knot value, and could be any minimum number of a data type of the set object that is used to represent an expression of a collection of objects.

Normalizing a set object need not be limited to the standard and extended normalizations discussed above. Also, the "standard" normalization processes need not be default normalizations that are performed, and the extended normalizations need not be normalization processes performed in addition to any other normalization processes. To normalize set objects any combination of processes can be used. For example, normalization of a set object that is implemented using a float data type might involve normalizing the first and last values, yet, the intervals need not be normalized. Also, normalizing need not be limited to normalizing a set object with integer values. As examples, the values may be calendar dates or names of persons that are ordered according to an inherent rank. However, the data types that can be normalized using the extended normalization processes might be limited. For example, floats and strings might not be suitable for the extended normalization processes. The normalization might be applicable to only certain set objects. For example, for a Cartesian Product set object the normalization process of the flow chart 1100 might have no influence.

The normalization process in the flow chart 1100 should be a normalization process that it is idempotent, which means, that if the result of the process were used as input for a second normalization, there would be no changes to the result (e.g., a set object might change during a first normalization, but, the normalized set object would not be modified if the same normalization process were performed on the normalized set object). The normalization of a set object according to the process of the flow chart 1100 might be performed after each time a set object is created. In this fashion, it can be ensured that a set object will always be normalized. Also, to ensure an appropriate programming paradigm, the normalization may occur before a constructor for a specific set type is called, as, for example, a normalized set object might change from a multi-dimensional set object with values to the empty set or the universal set.

Basic Set Operations on a Set Object

Basic set operations on a set object include complement, union, intersection, equality and containedness. To provide for basic set operations, some fundamental properties may be required of a set. For example, this may include being able to determine the dimension order of a set. As described earlier, the dimension information of a one-dimensional set may be retrieved from a set object with a method dim( ) providing the possibility to determine the dimension order of two one-dimensional sets (i.e., checking A.dim( )<B.dim( ), if A and B are two one-dimensional set objects).

Complement

If a one-dimensional set is defined, as described earlier, to include a partition set collection represented by a partition bit array (or bit vector), the complement of a one-dimensional set can be calculated by calculating the bit-complement of the partition bit array (or bit vector) (i.e., a "0" becomes a "1", and vice versa). This operation should not violate the standard normalization property of a set (i.e., if a one-dimensional set is normalized its complement is also normalized).

For a multi-dimensional set defined as combination of empty sets, universal sets, union sets, Cartesian Product sets, and one-dimensional sets, where the one-dimensional sets are represented by a partition bit array (or bit vector), the complement can be calculated in accordance with the following.

The complement of a Cartesian Product set C can be calculated by using De Morgan's laws: C.complement( ):= C.D.complement( ).unite(C.F.complement( )). In other words, the complement of a data structure representing a Cartesian Product can be calculated iteratively as the union of (1) the complement of the first Cartesian Factor D and (2) the complement of the second Cartesian Factor F. For example, because the Cartesian Factor D may always be a one-dimensional set, the complement of D may be calculated as defined above, for partition bit arrays (or vectors). If the Cartesian Factor F is a one-dimensional set, the Cartesian Factor F can be calculated likewise, otherwise, it may be calculated by nested calculations using the techniques for calculating the complement of a Cartesian Product, a one-dimensional set, and/or union set.

Figure 6:
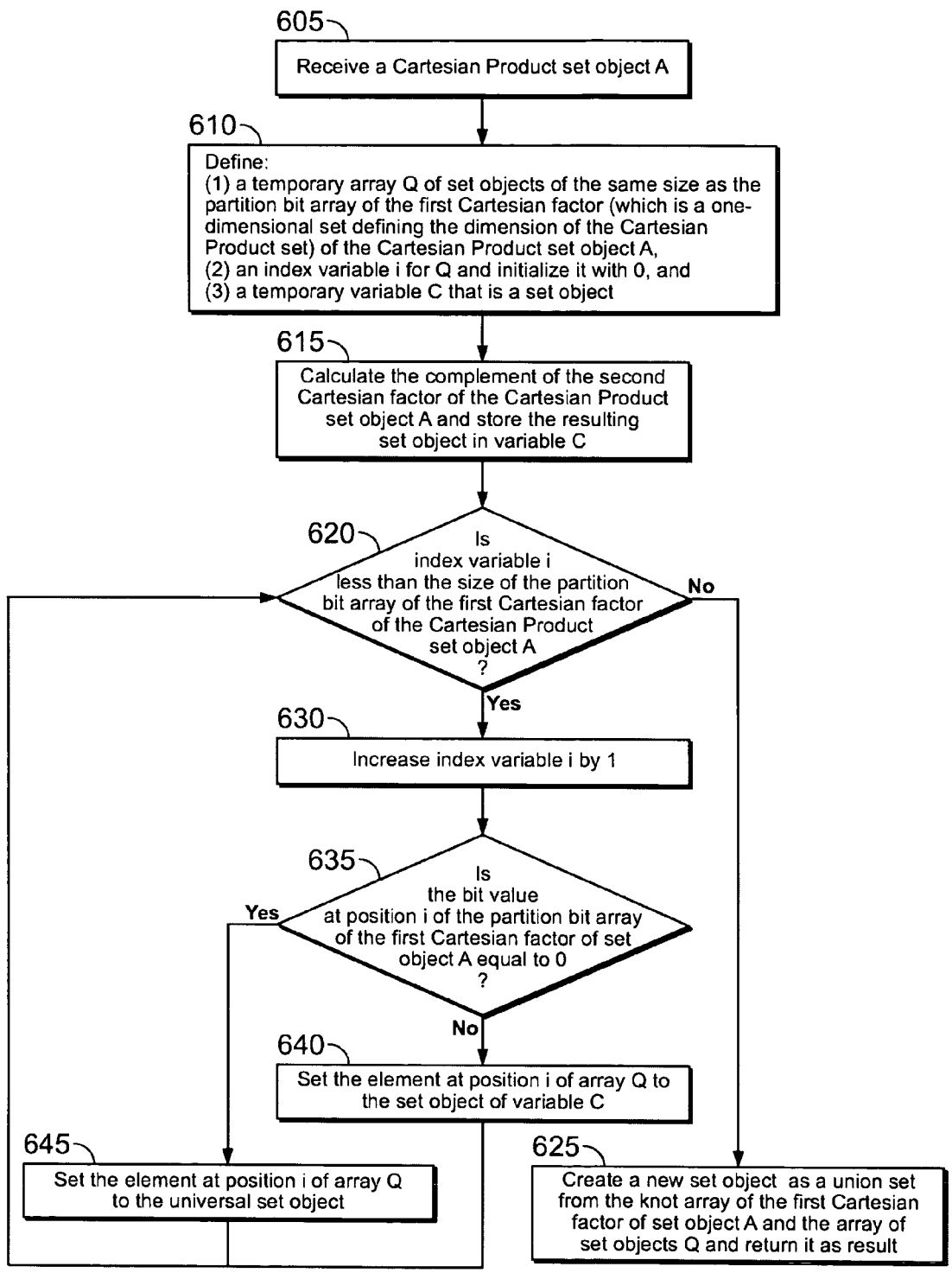
FIG. 6 is a flowchart of a process of calculating the complement of a Cartesian Product set object.

FIG. 6 is a flowchart of a process of calculating the complement of a Cartesian Product set object. A Cartesian Product set object is a data structure representing a Cartesian Product set that follows the model described above. The data structure includes an array of knot values and a partition array of references to objects.

At 605, a Cartesian Product set object A is received. For example, the Cartesian Product set object may be received as the result of a function call asking for the complement of a Cartesian Product set object A. The Cartesian Product set object A is a normalized Cartesian Product set object defined in accordance with the model described earlier. At 610, various variables are defined and/or initialized for the processes to be performed, including (1) defining a temporary array Q of set objects of the same size as the partition bit array of the first Cartesian Factor (which is a one-dimensional set defining the dimension of the Cartesian Product set) of the Cartesian Product set object A, (2) defining an index variable i for Q and initializing it as "0", and (3) defining a temporary variable C that is a set object.

At 615, a complement of the second Cartesian Factor of the Cartesian Product set object A is calculated, and the resulting set object is stored in the set object variable C. This may lead to a nested execution of complement operations that is finite because a dimension level is increased by at least 1 with each nested execution, according to the normalization conditions for Cartesian Product set objects. In other words, the dimension order is defined from 1 to x, where x is the last dimension, and the dimension order increases by at least one for each nested level. Thus, calculating the complement of a Cartesian Factor may lead to nested calculations for set objects that represent that Cartesian Factor.

At 620 a determination is made as to whether the index variable i is less than the size of the partition bit array of the first Cartesian Factor of the Cartesian Product set object A. If the result of that determination is "no", at 625 a new union set object is created that has the knot value array of the first Cartesian Factor of set object A and the partition set array of set objects of Q, and the new set object is returned as a result to the process of FIG. 10. Because the first Cartesian Factor is always a one-dimensional set, the knot array from the first Cartesian Factor and the array Q, in combination, represent a normalized representation of union set object.

Referring back to 620, if the result from the determination was "yes", the index variable i is increased by 1, at 630. At 635, a determinations is made as to whether the bit value at position i of the partition bit array of the first Cartesian Factor of set object A is equal to 0. If the result is no, the element at position i of array Q is set to the set object of variable C. If the result of the determination is "yes", the element at position i of array Q is set to the universal set object. The process returns to 620 from the processes at 640 and 645, thereby allowing the process to iterate across the Cartesian Product set object A.

A union set can be calculated using the following model. With the definitions $\Pi_i := S\Pi(i)$ for $i=1 \ldots 2n+1$ and $P_i := S.P(i)$ for $i=1 \ldots 2n+1$, where $S.P(i)$ and $S.\Pi(i)$ are defined as defined earlier and n represents the size of the union set, a union set S can be expressed similar to a dimension set as:

$$S = \bigcup_{i=1}^{2n+1} \Pi_i \cap P_i,$$

where the sets $\Pi_i$ form a partitioning of the universal set U.

Calculating the complement of this expression, according to De Morgan's laws, may be according to the expression:

$$\overline{S} = \bigcup_{i=1}^{2n+1} \overline{(\Pi_i \cap P_i)}.$$

This is because, according to De Morgan's laws the complement of a union set is the union of the complement of all partitions and partition values, such that, $$\overline{S} = \bigcap_{i=1}^{2n+1} (\overline{\Pi_i} \cup \overline{P_i}).$$

Using the identity $U = \overline{\Pi_i} \cup \Pi_i$ that expression can be expressed as:

$$\overline{S} = \bigcap_{i=1}^{2n+1} (\overline{\Pi_i} \cup U \cup \overline{P_i}) =$$

$$\bigcap_{i=1}^{2n+1} (\overline{\Pi_i} \cup (\overline{\Pi_i} \cup \Pi_i) \cap \overline{P_i}) = \bigcap_{i=1}^{2n+1} (\overline{\Pi_i} \cup \overline{\Pi_i} \cap \overline{P_i} \cup \Pi_i \cap \overline{P_i}).$$

Using the absorption rule $A = A \cup (A \cap B)$ this expression can be simplified to:

$$\overline{S} = \bigcap_{i=1}^{2n+1} (\overline{\Pi_i} \cup \Pi_i \cap \overline{P_i}).$$

Because the sets $\Pi_i$ form a partitioning of the universal set U, terms like $\Pi_i \cap \overline{P_i} \cap \Pi_j \cap \overline{P_j}$ will vanish for $i \neq j$. Thus, a complete factorization of the above term will only retain the terms:

$$\overline{S} = \bigcap_{i=1}^{2n+1} \overline{\Pi_i} \cup \bigcup_{i=1}^{2n+1} \left( \bigcap_{\substack{j=1 \\ j \neq i}}^{2n+1} \overline{\Pi_j} \cap (\Pi_i \cap \overline{P_i}) \right),$$

where the first term of this expression evaluates to the empty set because it is the complement of the partitioning condition $$U = \bigcup_{i=1}^{2n+1} \Pi_i.$$

As per the second term, the identity $$\Pi_i = \bigcap_{\substack{j=1 \\ j \neq 1}}^{2n+1} \overline{\Pi_j}$$

can be used to simplify the whole expression to:

$$\overline{S} = \bigcup_{i=1}^{2n+1} (\Pi_i \cap \overline{P_i}).$$

Provided that the original union set is already normalized as defined by in the description of normalization conditions for union sets, either a normalized Cartesian Product set or a normalized union set should be the result of the complement of a union set.

Figure 7:
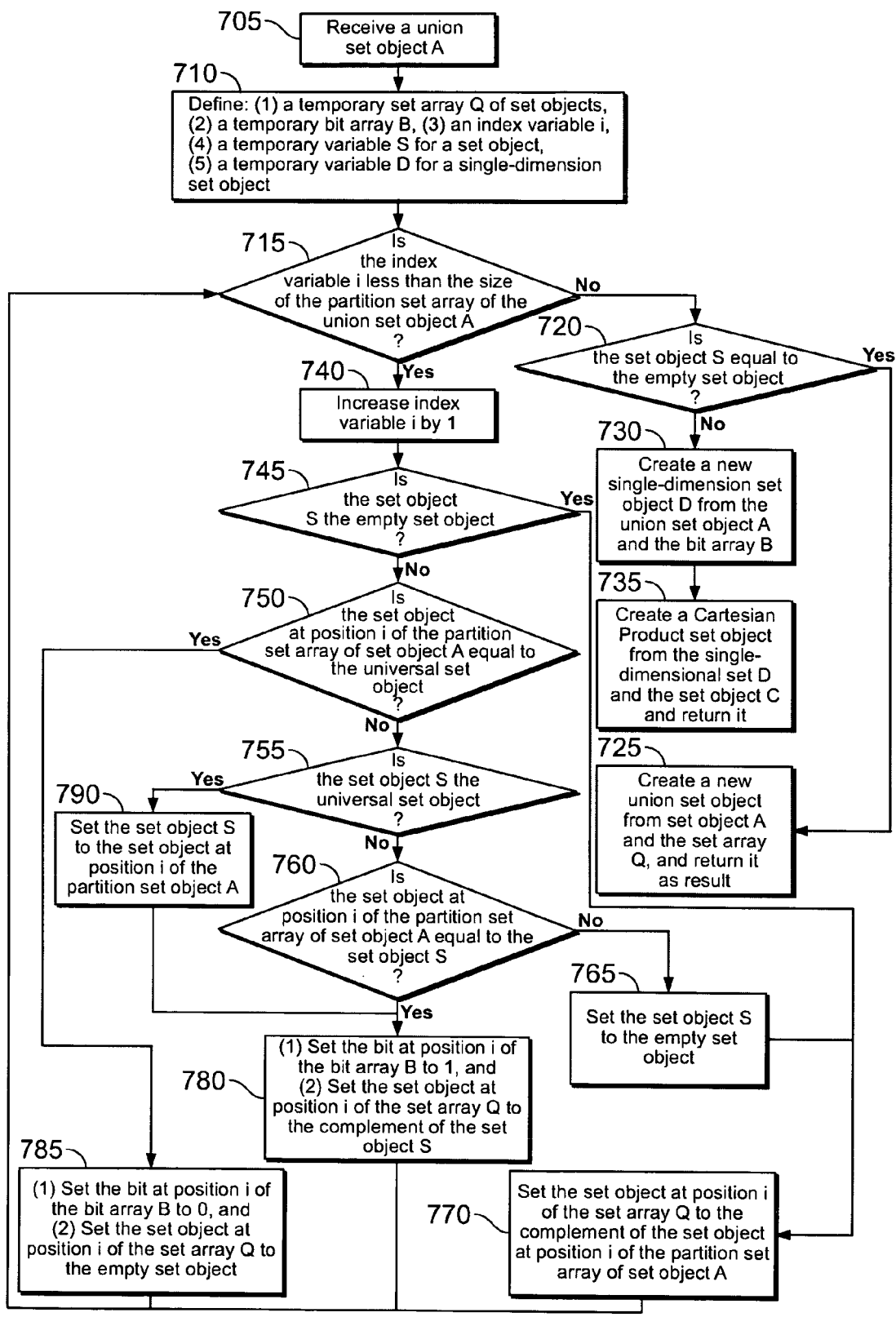
FIG. 7 is a flowchart of a process of calculating the complement of a union set object.

FIG. 7 is a flowchart of a process of calculating the complement of a union set object (i.e., a data structure representing a union set). The multi-dimensional model followed for the union set follows the multi-dimensional model described above. The data structure of the union set includes a partition set array and an array of knot values. Other types of sets in the multi-dimensional model also represent partitions as arrays and collections of knot values as arrays.

At 705 a union set object A is received. For example, the union set object maybe received as the result of a function call asking for the complement of a union set object. The union set object is a normalized union set object defined in accordance with the model described earlier.

At 710, variables are defined. These variables include (1) a temporary set array Q of set objects of the same size as the partition set array of the union set object A, (2) a temporary bit array B of the same size as the partition set array of the union set object A, (3) an index variable i initialized to 0, (4) a temporary variable S for a set object initialized with the universal set object, and (5) a temporary variable D for a one-dimensional set object.

At 715 a determination is made as to whether the index variable i is less than the size of the partition set array of the union set object A. In other words, the determination determines whether the bounds of the partition bit array are exceeded by the running index value i. The determination may be made, for example, by calling a function returning the size of a partition set array of the union set object If the result of the determination at 715 is "no", the process continues at 720. At 720, a determination is made as to whether the set object S is equal to the empty set object (which is a check of a normalization condition (N5) for multi-dimensional sets, defined above). If the set object S is the empty set object, at 725 a new union set object is created and that union set includes the same dimension and the same knot value array as the union set object A, and a partition set array that is the same as the set array Q. The new union set is returned as a result of the process illustrated in FIG. 7. Otherwise, a new one-dimensional set object D is created, having the same dimension and the same knot array as the union set object A, and the bit array B as partition bit array (730). Then, at 735, a Cartesian Product set object is created from the one-dimensional set D (as a first Cartesian Factor) and the set object C (as a second Cartesian Factor), and the Cartesian Product set object is returned as the result of the process of FIG. 7.

Referring to the processes at 715, if the determination resulted in "yes", the index variable i is incremented by 1 at 740. At 745 a determination is made as to whether the set object S is the empty set object. If the set object S is the empty set, at 770 the set object at position i of the set array Q is set to the complement of the set object at position i of the partition set array of set object A. Otherwise, at 750 a determination is made as to whether the set object at position i of the partition set array of set object A is equal to the universal set object. For example, because the union set objects may include an array of references as the partition set array, this process may include determining whether a partition set array at the index i refers to the universal set.

If, at 750, the result is "yes", at 785 the complement of position i is calculated. This calculation includes (1) setting the bit at position i of the bit array B to 0, and (2) setting the set object at position i of the set array Q to the empty set object.

If, at 750, the result is "no", at 755 a determination is made as to whether the set object S is the universal set object. If the set object S is the universal set object, at 790 the set object S is set to the set object at position i of the partition set array of set object A. In other words, the set object S takes the set of the current set referred to by index i of set object A. At 780, the bit at position i of the bit array B is set to 1, and the set object at position i of the set array Q is set to the complement of the set object S.

If, at 755, the result was "no", at 760 a determination is made as to whether the set object at position i of the partition set array of set object A is equal to the set object S. If the result of this determination is "yes", the process continues at 780, as described above. Otherwise, at 765 the set object S is set to the empty set object. At 770 the set object at position i of the set array Q is set to the complement of the set object at position i of the partition set array of set object A. From the processes described at 780, 785, and 770, the process of FIG. 7 continues in an iterative fashion, at 715.

Intersection

Figure 8A:
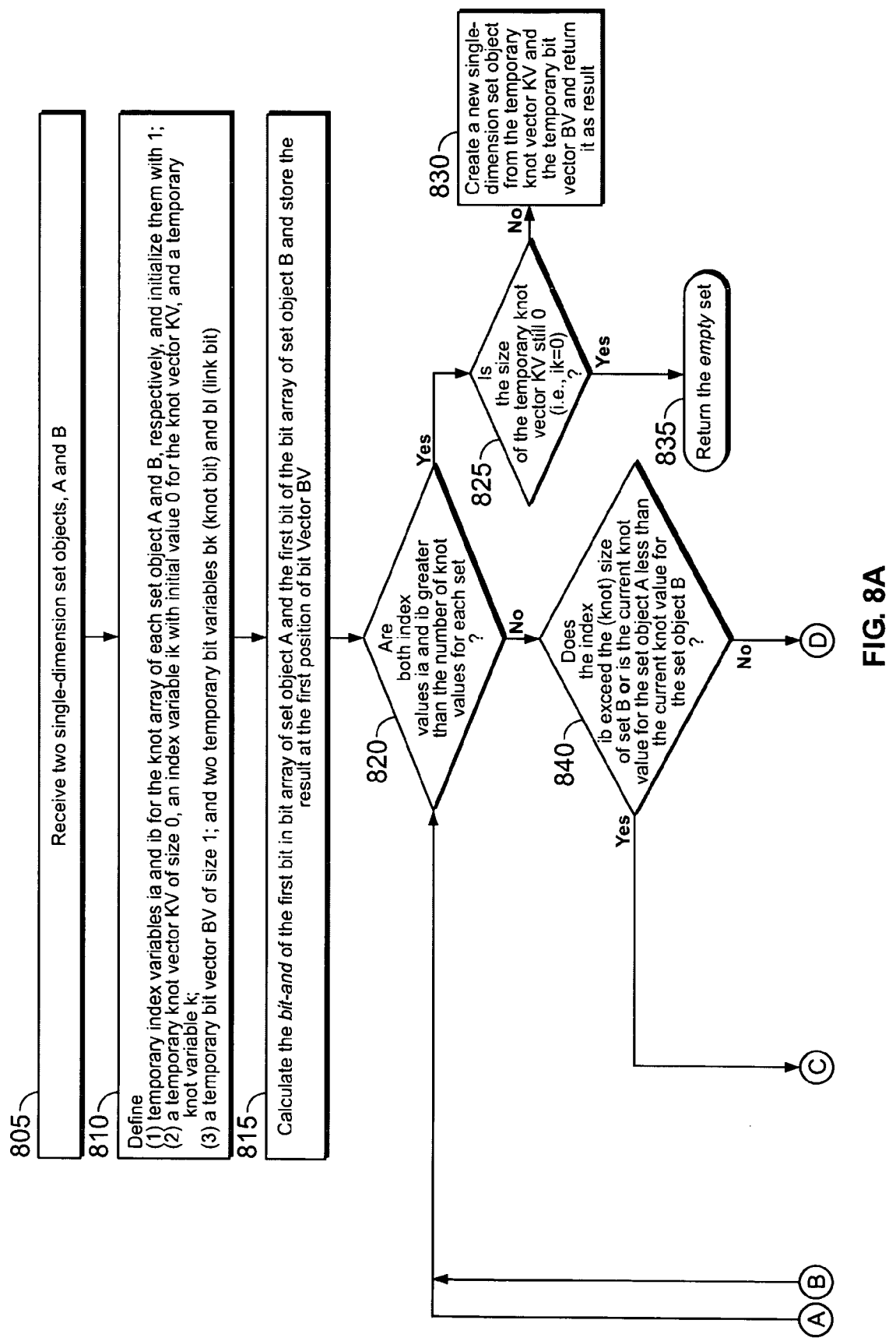
FIGS. 8A and 8B include a flowchart of a process of calculating the intersection of two one-dimensional set objects.
Figure 8B:
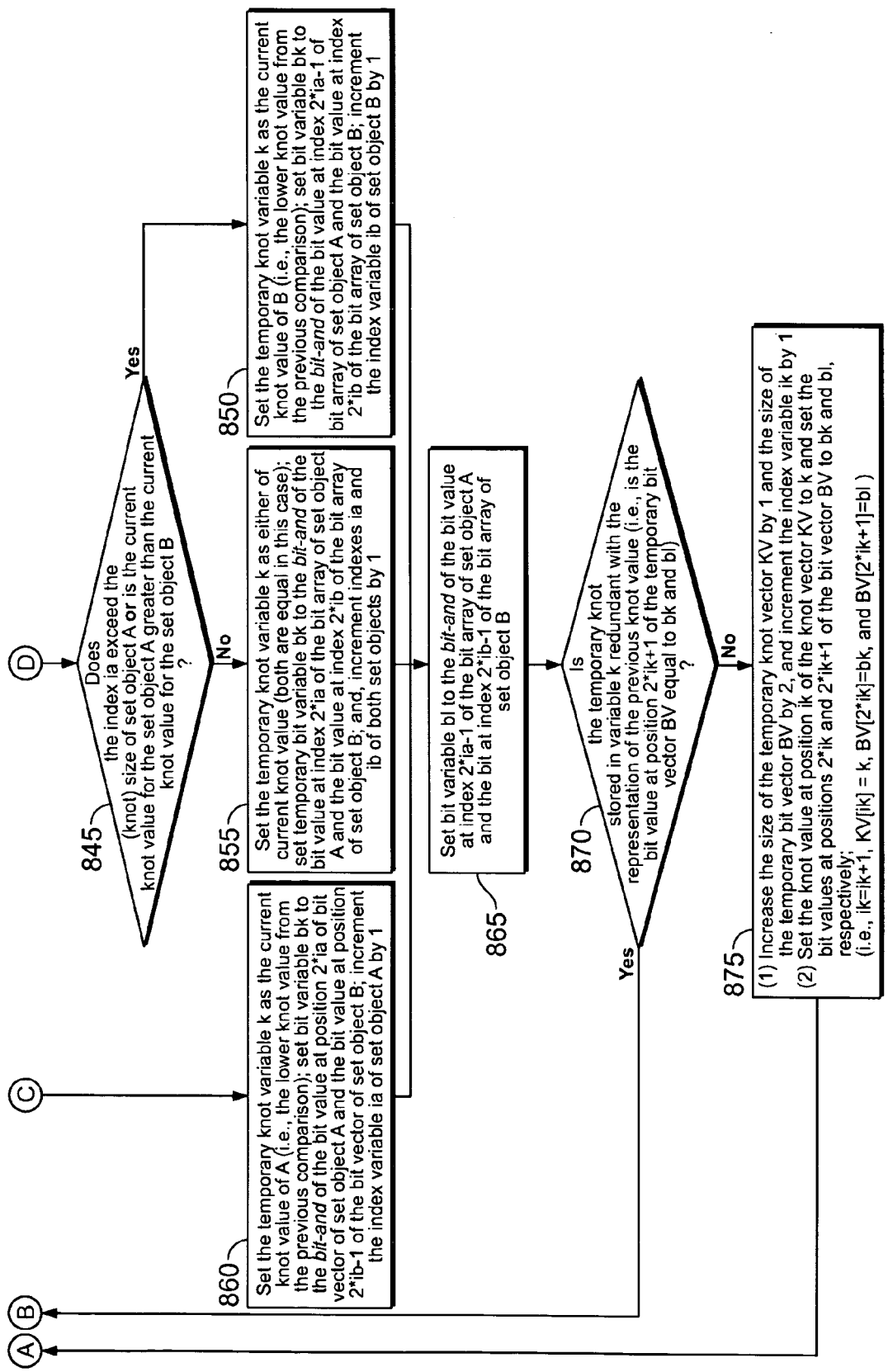

To perform the intersection of two one-dimensional sets, the two sets should belong to the same dimension. FIGS. 8A and 8B include a flowchart of a process of calculating an intersection of two one-dimensional set objects. The figures are logically connected by reference letters A through E. The intersection is calculated for a set object A and a set object B, and the two set objects represent normalized sets according to the normalization conditions described earlier for one-dimensional objects. In general, the process involves traversing knot values, and partition sets for each range of knot values, of the set objects A and B to see if an intersection of the two set objects lies in similar ranges of values.

At 805, two set objects, A and B, are received. Temporary variables (i.e., variables that are used for the scope of the process defined in FIGS. 8A and 8B) are defined and initialized at 810. The processes at 810 include, (1) defining temporary index variables ia and ib for the knot array of each set object A and B, respectively, and initialize them with 1; (2) defining a temporary knot vector KV of size 0, an index variable ik with initial value 0 for the knot vector KV, and a temporary knot variable k; and, (3) defining a temporary bit vector BV of size 1, and two temporary bit variables bk (representing a knot bit) and bl (representing a link bit).

At 815, the bit-and of a first bit in a bit array of set object A and a first bit of a bit array of set object B is calculated, and the result is stored at a first position of bit vector BV. At 820, a determination is made as to whether both index values ia and ib are greater than the number of knot values for each set. In other words, sizes of the knot arrays of each set are compared to ensure that at least one index will be within the size of the corresponding knot array of the respective set object A or B. If the determination results in a "yes", at 825 a determination is made as to whether the size of the temporary knot vector KV is 0 (i.e., ik=0). If the size is not 0, at 830, a new one-dimensional set object is created with the temporary knot vector KV being the collection of knot values for that set object and the temporary bit vector BV being the partition bit vector for that set object, and the new set object is returned as a result. Otherwise, at 835, the empty set is returned as a result.

Referring back to the processes at 820, if the determination results in a "no", a determination is made at 840 as to whether the index ib exceeds the size of set object B (i.e., the amount of knots in the set object B), or if the current knot value for the set object A (i.e., value stored at index ia of the knot array of set object A) is less than the current knot value for the set object B.

If the result of the process at 840 is a "no", at 845 a determination is made as to whether the index ia exceeds the (knot) size of the set object A, or whether the current knot value for the set object A is greater than the current knot value for the set object B. If the knot value indexed by ia is greater than the knot value indexed by ib or the current knot value for the set object A is greater than the current knot value for the set object B, at 850, (1) the temporary knot variable k is set as the current knot value of B (i.e., the lower knot value from the previous comparison); (2) the bit variable bk is set to the bit-and of the bit value at index 2*ia−1 (i.e., 2 times ia, minus 1) of bit array of set object A and the bit value at index 2*ib (i.e., 2 times ib) of the bit array of set object B; and (3) the index variable ib is incremented by 1.

If the result of the process at 845 is a "no", at 855 a series of processes are performed. Those processes include, (1) setting the temporary knot variable k as the current knot value of either set object A or set object B (both knot values are equal in this case, so it should not matter which knot value is used); (2) setting temporary bit variable bk to the bit-and of the bit value at index 2*ia of the bit array of set object A and the bit value at index 2*ib of the bit array of set object B; and, (3) incrementing indexes ia and ib of both set objects by 1.

Referring back to 840, if the index ib exceeded the (knot) size of the set object B or if the current knot value for the set object A was less than the current knot value for the set object B, at 860 a series of processes are performed. These processes include, (1) setting the temporary knot variable k as the current knot value of A (i.e., the lower knot value from the previous comparison); (2) setting the bit variable bk to the bit-and of the bit value at position 2*ia of bit vector of set object A and the bit value at position 2*ib−1 of the bit vector of set object B; and (3) incrementing the index variable ia by 1.

At 865, the bit variable bl is set to the bit-and of the bit value at index 2*ia−1 of the bit array of set object A and the bit value at index 2*ib−1 of the bit array of set object B. At 870, a determination is made as to whether the temporary knot value stored in variable k is redundant with the representation of the previous knot value (i.e., whether the bit value at position 2*ik+1 of the temporary bit vector BV equal to bk and bl). This determination allows redundant knot values to be effectively removed from the result of the intersection of set objects A and B.

If the temporary knot value was not redundant, at 875 the temporary knot value is added to the temporary set object through a series of processes that include, (1) increasing the size of the temporary knot vector KV by 1 and the size of the temporary bit vector BV by 2, and incrementing the index variable ik by 1; and, (2) setting the knot value at position ik of the knot vector KV to k and set the bit values at positions 2*ik and 2*ik+1 of the bit vector BV to bk and bl, respectively.

To calculate the intersection of two multi-dimensional sets, each multi-dimensional set should exist in the same multi-dimensional universal set U. A generalized version of the processes discussed in reference to FIGS. 8A and 8B can be used to calculate the intersection of two multi-dimensional set objects. The process can rely on the postulation that there is a given order of the dimensions, that every multi-dimensional set—and in particular either of the operands of the intersection—has an assigned dimension, that the dimension of a first operand is of less or equal order than the dimension of a second operand (if the latter is not true, the operands for the intersection maybe interchanged according to the commutation property of the operation), and finally, that set components to which a multi-dimensional set object refers (e.g., the second Cartesian factor of a Cartesian Product set and all partition sets of a union set) are assigned to a higher dimension than the set itself. In that postulation, operations are performed iteratively from a dimension of a lower level to dimensions of a higher level (i.e., from 1 to x). In that postulation, the empty set and the universal set should always have the highest level (i.e., highest order dimension). Thus, calculating the intersection of two multi-dimensional sets may involve the nested intersection of all subsets to be calculated along an order of dimensions.

Figure 9A:
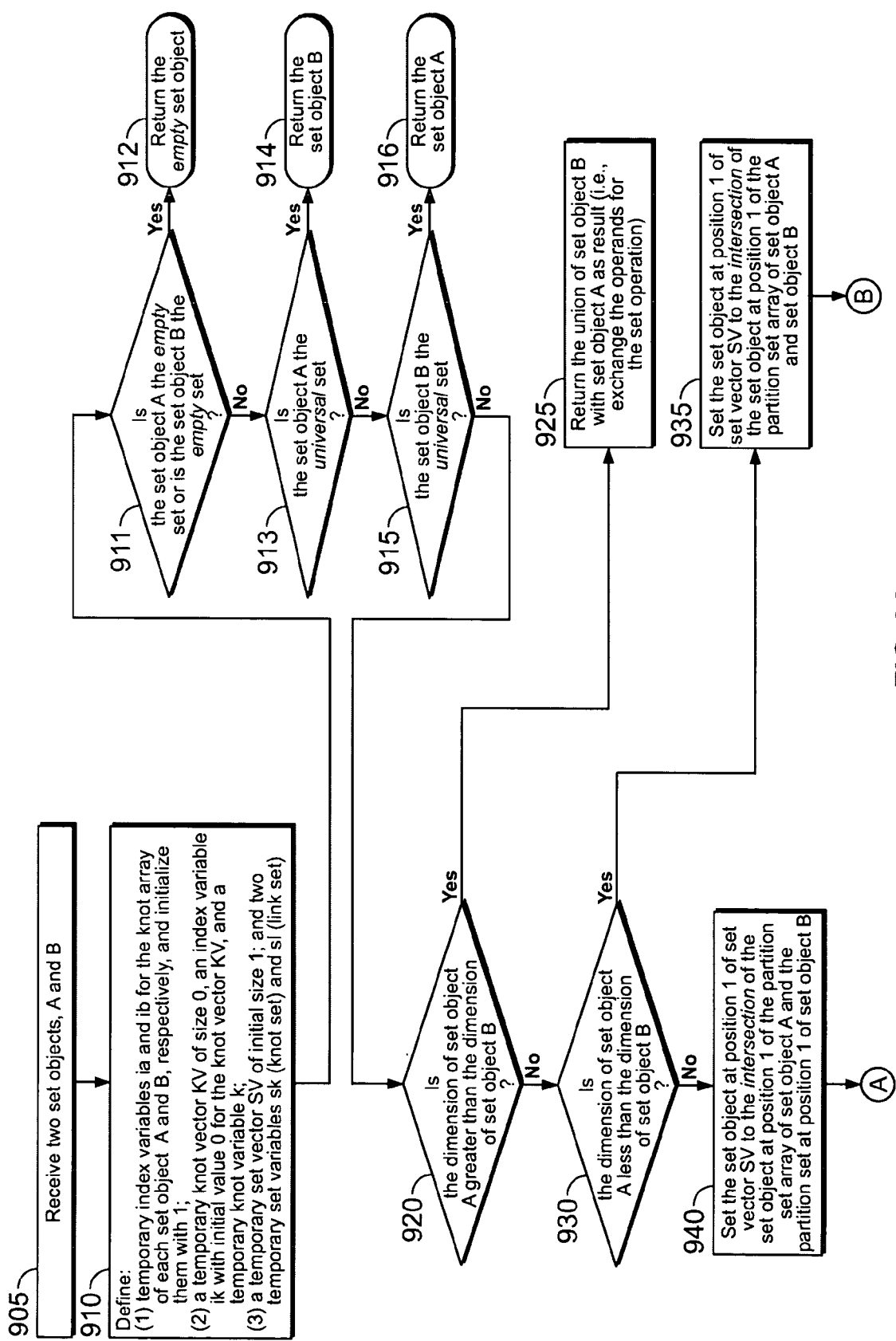
Figure 9B:
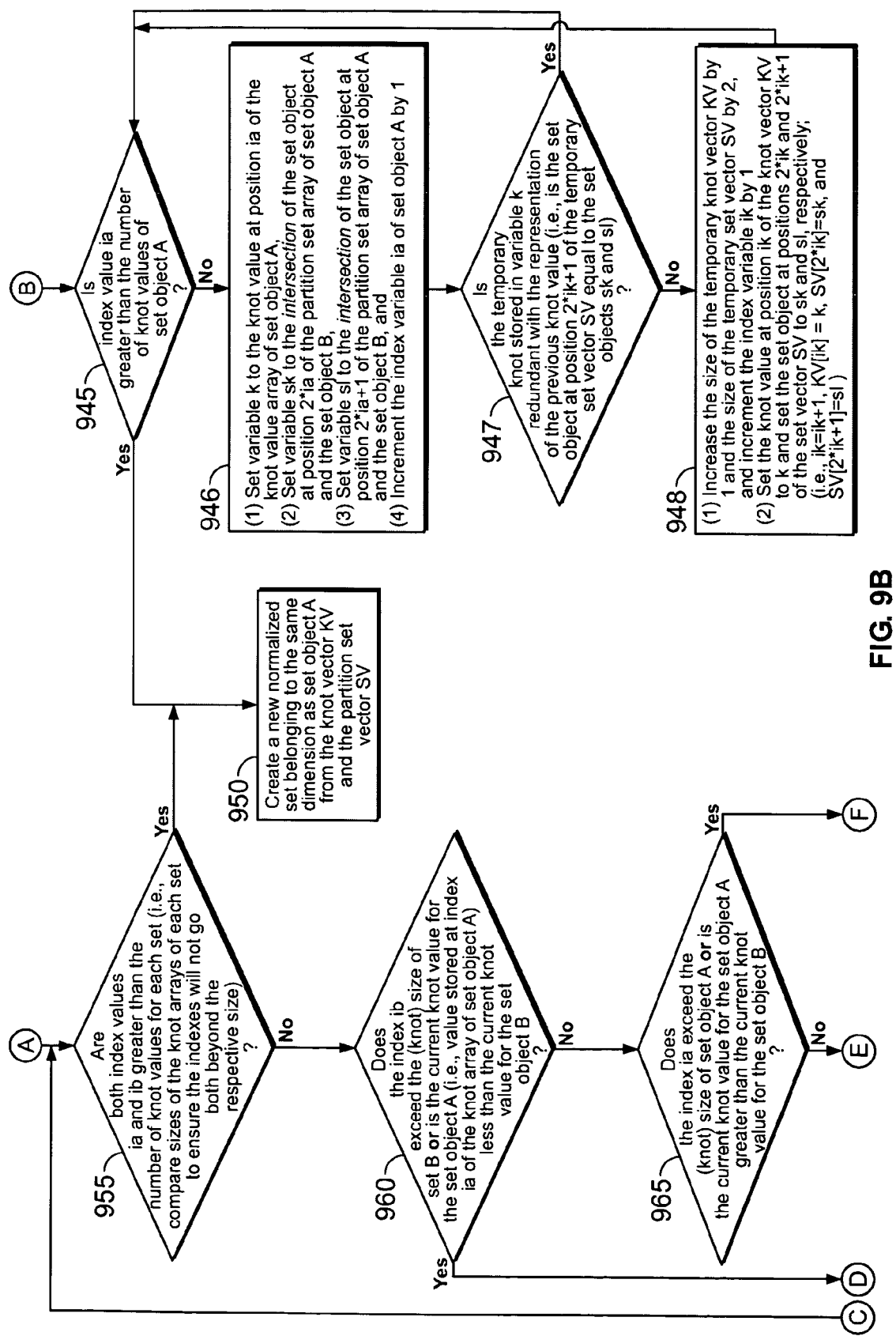

FIGS. 9A through 9C include a flowchart for calculating the intersection of two multi-dimensional set objects. As can be observed from comparing FIGS. 8A and 8B, the process of FIGS. 9A through 9C can be derived from the process of FIGS. 8A and 8B. Some of the differences between the process of FIGS. 8A though 8B and the process of FIGS. 9A through 9C, involve an addition of "shortcuts." For example, the process of calculating an intersection of a multi-dimensional set involves an additional series of checks performed at 911, 913, and 915 to see if either set is the empty set, or the universal set. If either set is the empty set, the empty set is returned at 912. If either set is the universal set, the other set is returned. For example if set object A represents the universal set, set object B is returned at 914 as the intersection of set objects A and B. This series of checks avoids having to go further down the process.

The process of FIG. 9 involves traversing across the dimensions order (i.e., dimension level) of dimension set objects for dimensions that are not of equal dimension order, and traversing the knot values of set objects and the partition sets for those knot values, of dimensions of set objects that are of the same dimension order.

At 920 and 930 a determination is made as to whether the dimension order of set object A and set object B are equivalent. If the dimension order is equivalent, at 940, 955, 950, 960, 965, 970, 975, 980, 985, 990, and 995 knot values and partition sets of two sets of multi-dimensional set objects that have the same dimension order are traversed (e.g., a dimension company of a set object A and of a set object B are traversed). Otherwise, at 935, 945-948, and at 950, the dimension order of set objects are traversed (i.e., the dimension order is traversed to find matching dimensions across two set objects). As part of traversing the dimension orders, the process of FIGS. 9A through 9C may be called for nested calculation at 946.

The process of FIGS. 9A through 9C generates a union set according to normalization conditions (N1) and (N2) for a union set. The process may further ensure that the returned set also fulfills the normalization conditions (N3) to (N5), for example, by ensuring that the union set is properly generated.

Additional and/or different processes may be added to the process of FIGS. 9A through 9C. These processes may handle special cases. For example, the intersection of two one-dimensional sets having the same dimension may be performed according to the process of FIGS. 8A and 8B. As another example, the intersection of a one-dimensional set and an arbitrary set which belongs to a higher dimension is just a Cartesian Product set having the one-dimensional set as the first Cartesian Factor and the other set as the second Cartesian Factor. Thus, the process of FIGS. 9A through 9C may be modified accordingly.

As another example, the intersection of a Cartesian Product set as the first operand (i.e., set object A) with an arbitrary set as the second operand (i.e., set object B) that is of a higher dimension may be a special case. In that case, the result can be the empty set if the intersection of the second Cartesian Factor of the first operand (i.e., the Cartesian Factor F of set object A, A.F) with the second operand (i.e., set object B) is the empty set. Otherwise, the result can be a Cartesian Product set having the same first Cartesian Factor as the first operand (i.e., the Cartesian Factor D of set object A, A.D), and the second Cartesian Factor as the intersection of the second Cartesian Factor of the first operand (i.e., the Cartesian Factor F of the set object A, A.F) with the second operand (i.e., the set object B).

Union

Calculating the union of two one-dimensional sets can directly be derived from the algorithm for the intersection given before by making usage of the identity $$A \cup B = \overline{\overline{A} \cap \overline{B}}.$$

Using this identity (based in general on the duality of the two operators in Boolean Algebra), the replacements (marked in italics in FIGS. 8A and 8B) (R1) and (R2) can be made to derive a method of generating the union of two sets. The replacements include:

(R1) Replace (bit-) and-operations with (bit-) or-operations, and (R2) Replace the empty set with the universal set.

As per calculating the union of multi-dimensional sets, calculation of the union of two multi-dimensional set objects is complementary to calculating the intersection, as described herein. The process of calculating the union can be derived by performing the replacements (R1) and (R2) to the process illustrated in FIGS. 9A through 9C (appropriate text in italics):

(R1) Replace operation intersect with unite.

(R2) Replace the empty set object with the universal set object, and vice versa.

Equality

For the set operations described earlier, it may be necessary to check if two set objects are equal (i.e., having the same normalized representation and same values) or not. For two typically trivial cases, the empty set and the universal set, a comparison of the identity (i.e., comparison of object references) might be sufficient. Other sets that may require a more involved check of equality include the one-dimensional set, the Cartesian Product set, and the union set. In a data structure representation for each type of set, a method isEqual( ) may be defined differently to implement the differences of the checks of equality.

Figure 10A:
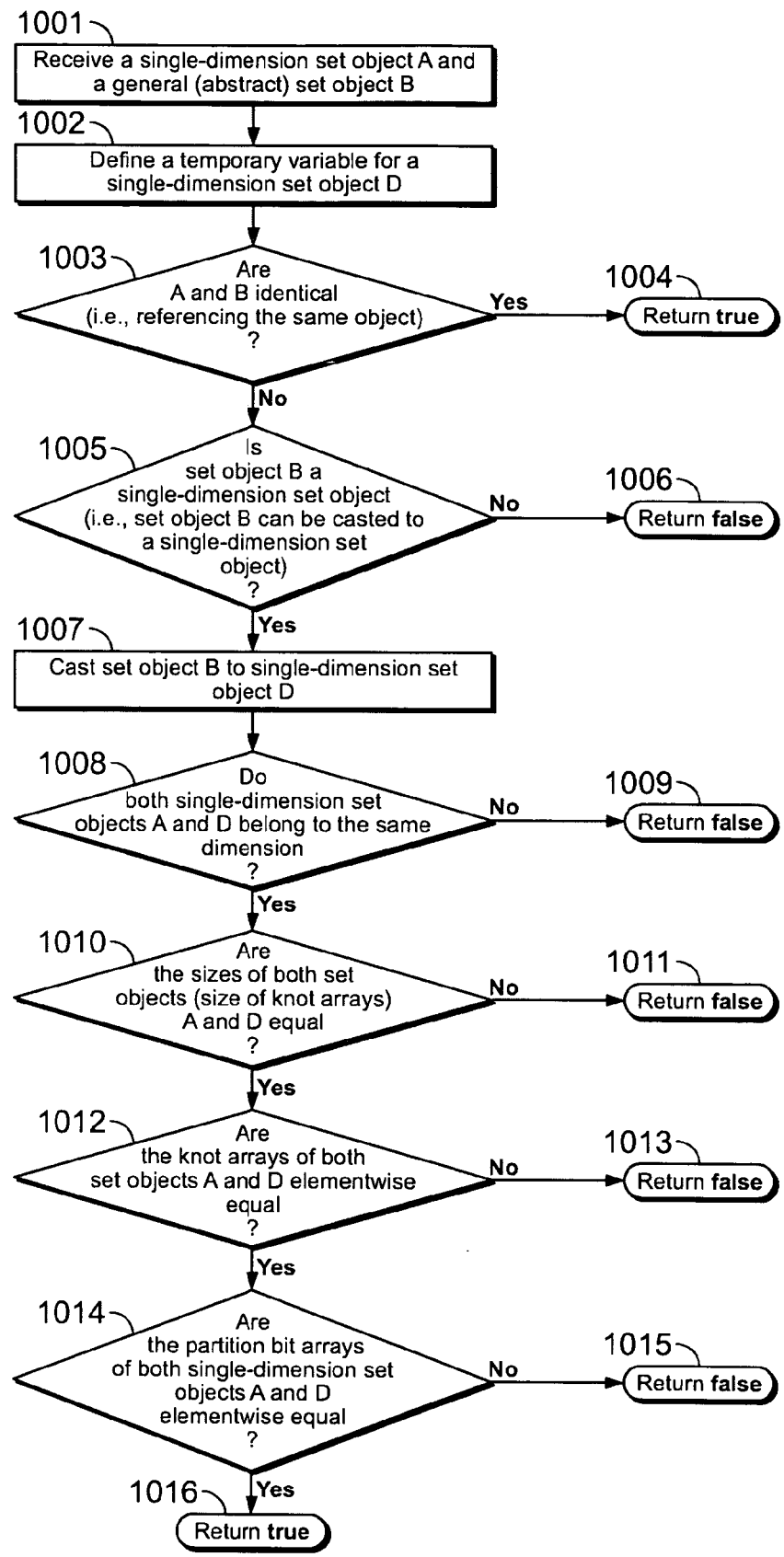
FIGS. 10A, 10B, and 10C include flowcharts illustrating processes for performing an equality check on a one-dimensional set object, a Cartesian Product set object, and a union set object, respectively.
Figure 10B:
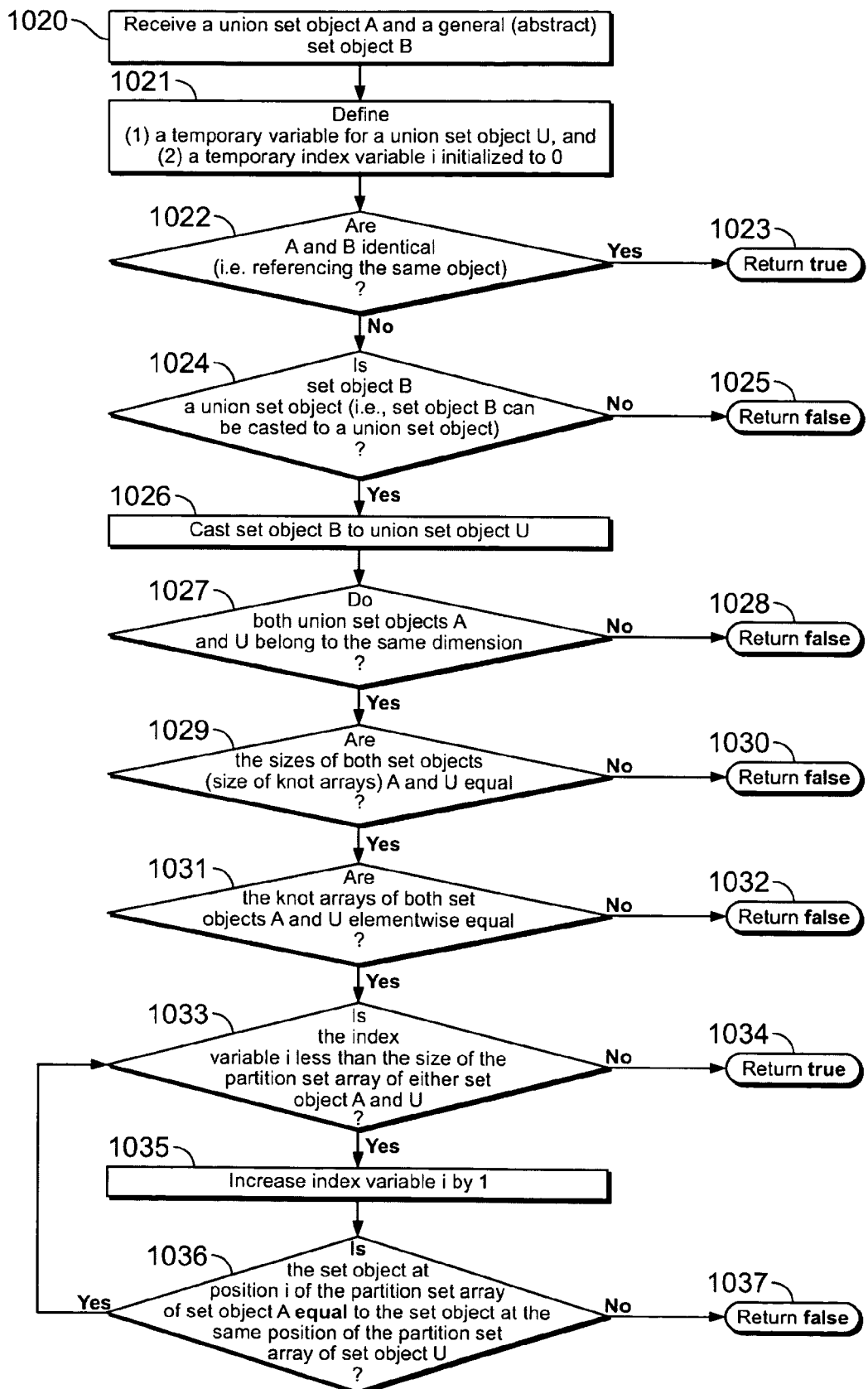
Figure 10C:
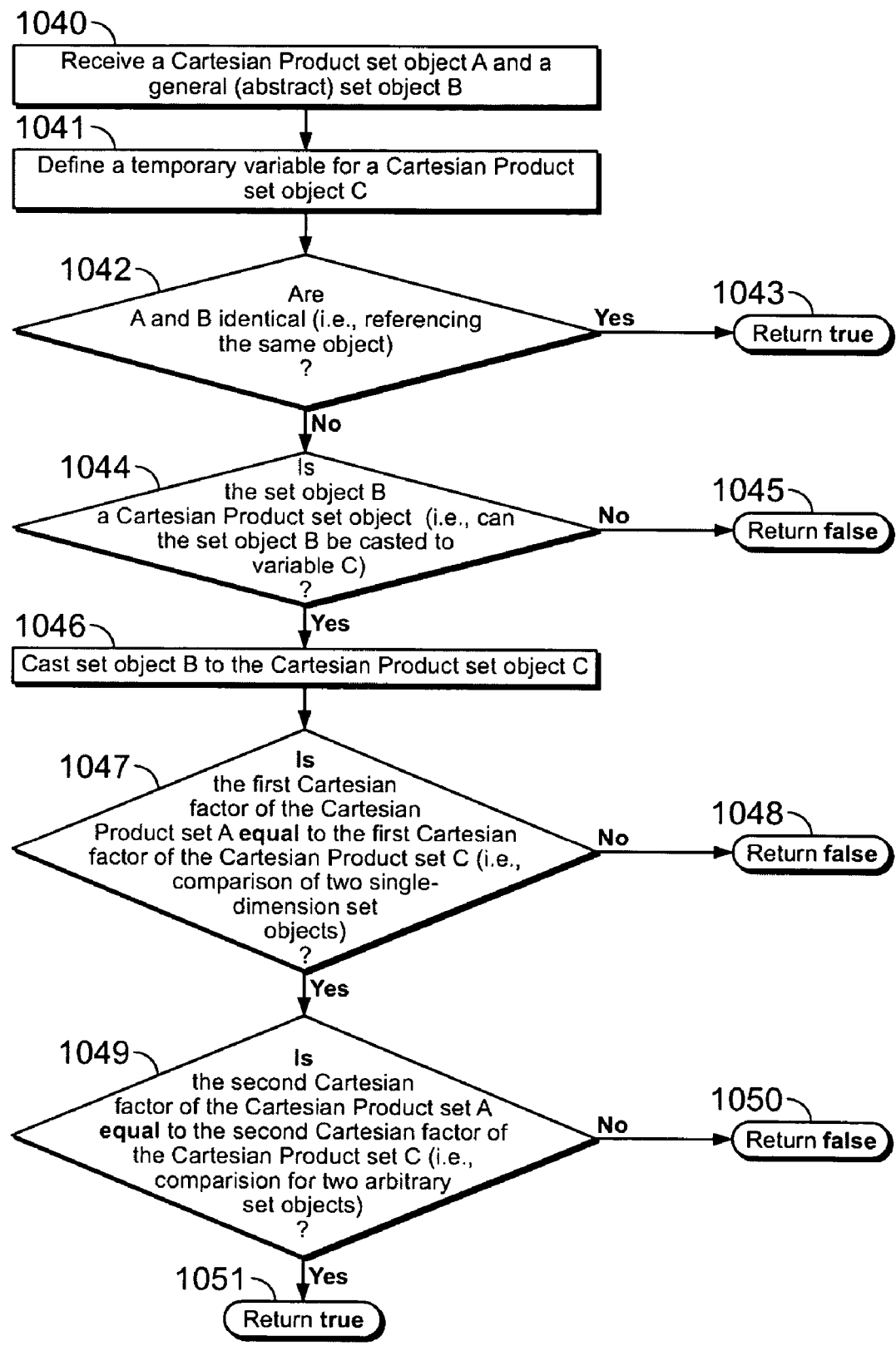

FIGS. 10A, 10B, and 10C include flowcharts illustrating processes for performing an equality check on a one-dimensional set object, a Cartesian Product set object, and a union set object, respectively. The processes illustrated in FIGS. 10A, 10B, and 10C are optimized so that they may be efficient processes of performing an equality check. Each of the figures include similar sets of processes, thus the three figures will be discussed together.

At 1001-1003, 1020-1022, or 1040-1042, two set objects A and B are received, a temporary variables are defined, and a check is made to determine if the set objects reference the same object (e.g., checking to see if the two objects are at the same location in memory). If the set objects reference the same object, the value true is returned at 1004, 1023, or 1043, representing that the set objects A and B are equal.

At 1005, 1024, or 1044, a determination is made as to whether the set object B is single-dimensional set object, Cartesian Product set object, or a union set object, respectively, by determining if the set object B can be casted to a temporary variable of the respective data type (i.e., determine if the set object B is of the appropriate data type). If the result is "no", then the set objects are not equal and the value false is returned at 1006, 1025, or 1045. Otherwise, the set object B is casted to the temporary variable at 1007, 1026, or 1046.

At 1008-1016, 1027-1037, or 1047-1051, the set objects A and B (as represented by a temporary variable) are evaluated against each other. At 1008-1016, the evaluation involves determining if the two objects belong to the same dimension, determining if the size of both set objects is equal, determining if the knot arrays contain the same knot values, and determining if the partition bit arrays contain the same values. If all of these determinations result in "yes", true is returned at 1016; otherwise, false is returned (1009, 1011, 1013, or 1015).

At 1027-1037, the evaluation involves determining if the two objects belong to the same dimension, determining if the size of both set objects is equal, determining if the knot arrays contain the same knot values, and iteratively checking all referenced objects of the union set objects to determine if the referenced set objects represent the same values. This process may involve calling any of the processes illustrated in FIGS. 10A-10C, to determine if nested set objects are equal. If all the referenced set objects represent the same values, true is returned at 1034; otherwise, false is returned (1028, 1030, 1032, or 1037).

At 1047-1051, the evaluation involves determining whether the first Cartesian Factor of set object A is the same as the first Cartesian Factor of set object B, and determining if the second Cartesian Factor of set object A is the same as the second Cartesian Factor of set object B. These processes may involve calling any of the processes illustrated in FIGS. 10A-10C, to determine if nested set objects are equal. If the corresponding Cartesian Factors are equal, true is returned at 1051; otherwise, false is returned (1048 or 1050).

Containedness

In order to check if a certain element c of a set $C_d \subseteq U_d$ is contained in a one-dimensional set S of size n (i.e., n=S.size( ), where n is the size of the set representation), a binary search can be used to find the minimum index $m \in [1 \ldots n]$ having $c \leq S.t[m]$. If the minimum does not exist, $c > S.t[n]$ is true and m is set to n+1. Then, a comparison of partition bits can be performed to determine if an element is in the set S. If $m \leq n \wedge C = S.t[m]$, the result is equivalent to $S.p[2m]=1$. Otherwise the result is equivalent to $S.p[2m-1]=1$. The effort to do this operation is just of order O(log n).

In the case of a multi-dimensional universal set U, the check of containedness has to be extended from a single scalar value as input to a tuple as input. If U is the Cartesian Product of n one-dimensional universal sets, the elements of U can be described as n-tuples where a component at the i-th position of a tuple is an element of the universal set of the i-th dimension. The check of containedness that is performed can depend on the object type. The following techniques (C1) through (C4) may be implemented to perform a check of containedness.

(C1) The empty set returns false and the universal set returns true as a result.

(C2) For the dimension set (e.g., DimensionSet 310 discussed earlier; i.e., a one-dimensional set object), the process of performing the check of containedness is generally the same as described above for a one-dimensional universal set U. The process may differ, such that, prior to a check of containedness for a tuple in a one-dimensional set, the corresponding component (i.e., if the dimension set is assigned to the i-th dimension the value at the i-th position of the tuple has to be taken) is projected out of the tuple from which it originated.

(C3) For the Cartesian Product set, checking for containedness may be delegated to the Cartesian Factors (i.e., the two components C.D and C.F). Then, boolean results from the check of containedness of each of those Cartesian Factors can be combined by an "and" operation, and returned as the result of the Cartesian Product set (i.e., the tuple must exist in each Cartesian Factor of a Cartesian Product set).

(C4) The check for the union set is similar to the check for the dimension set described at (C2). The appropriate component of a tuple is determined according to the union set's dimension and the value v of the component is used to find the minimum m with $v \leq U.t[m]$. If such a minimum does not exit $v > U.t[n]$ is true and m is set to n+1 with n=U.size( ). If $m \leq n \wedge v = U.t[m]$ the check is delegated to the (knot) partition set U.P[2m] otherwise a check is performed for the (link) partition set U.P[2m−1]. The corresponding result of the delegated check can be returned as the result of the union set.

Each check of containedness reduces the level of complexity of the problem at least by one, by removing a dimension order. Thus, a final result will be generated after n checks where n is the number of dimensions of the universal set U. In that scenario, each individual "dimension" check will take asymptotically O(log(m)) operations where m is the complexity (i.e., the size of a corresponding knot value array) of a set object on which a check of containedness is being performed.

Application to Data Aging

Many of today's enterprise applications and services are based on relational data models and are using relational databases to store their (consistent) states persistently. Relational data models are based on mathematical set theory. Set objects could be used to improve the efficiency of a relational data model.

Set-based conditions using dimensions that are meaningful for queries, and are related to the age of data that is frequently used, could be used to define a series of archive partitions. A data store is always partitioned in an online partition $O_n$ and an archive partition $A_n$. Typically, more time is needed to access data from the archive partition than the online partition. Both partitions are at any time identified by two complementary set conditions (as it is the nature of partitioning). At the beginning of a life of a system including an online and archive partition, an online partition $O_0$ contains all the data and is described by the universal set; whereas the archive partition $A_0$ is described by the empty set and contains no data.

An archiving process could be defined by a series of disjoint sets $R_n$ that define a series of archiving requests that change the partition state of the whole data store. All data that is selected by a request set $R_n$ can be consistently moved from an online partition to an archive partition. In that scenario, the new set 0, describing the online partition, after an n-th archiving request, can be defined as an intersection of the previous online set and the complement of the request set; i.e., $$O_n := O_{n-1} \cap \overline{R_n}.$$

The new set describing the archive partition can be defined as the union of the previous archive set with the request set; i.e., $$A_n := A_{n-1} \cup R_n$$

Thus, a new online partition set can be defined as the complement of the new archive partition set. If a query is to access data transparently from a whole data store (including frequently used data in an online store and less frequently used data in an archive, such as near-line storage), a selection condition of the query or the query's navigation step can be converted to a multi-dimensional set object Q. Calculating the intersection between Q and the current archive partition set $A_n$ can either result in an empty set or a non-empty set. In the first case, the archive partition will not contribute to the query's result set and access to the archive (which is typically significantly slower than access to the online partition) can be avoided a priori. In the latter case access to the archive partition cannot be avoided and the overall response time of the query depends on the indexing of the archive partition. Thus, overall response may be improved by optimizing the archiving process such that the first case frequently occurs. The overall result may be reduced access to typically slower, less frequently used storage.

Application to Multi-Dimensional Planning

Typical planning and budgeting processes read a certain subset of records according to a selection condition from a database table, modify these records, add new records within the specified selection condition, delete some records, and write the result back to the database such that a whole subset of selected records is replaced. In a multi-user environment the data range that can be manipulated is generally exclusively locked for a single user or process in order to avoid data inconsistencies. In some instances, it might not be sufficient to lock selected records, and a whole selected data range might be locked.

Using set objects in planning and budgeting applications may provide an exact multi-dimensional locking of data ranges, thus minimizing the resources that are locked, which may improve overall performance by avoiding bottlenecks associated with locked resources. The process of using set objects may be roughly explained as follows.

All currently locked data ranges can be stored as a multi-dimensional set (called a lock set) by a central lock service. On system startup the lock set can be set as the empty set (i.e., nothing is locked).

If a process (or user) is to create new records or change existing records for a certain non-empty data range (e.g., expressed by a SQL-like condition for key columns of the affected database table) (e.g., if a process is to require locked records), the process (or user) can pass a condition indicating the data range (or the records to be locked) to the central lock service.

At the central lock service, a condition passed from a process or user can be converted to a multi-dimensional set representation and that intersection of the multi-dimensional set representation and the current lock set can be calculated (i.e., the data to be locked can be calculated as an intersection of the current lock set and the passed condition). If the intersection is not the empty set, a lock request must be refused (i.e., there is common data so common access should not be allowed). If the intersection is the empty set (i.e., data is not common and is available for locking), the central lock service can store a union of the passed set and the current lock set as a new lock set (i.e., the lock set is updated). In addition, the service may store the complement of the passed set in a directory of open lock requests and return a unique handle to a lock requestor (i.e., a process or user requesting to lock data). The lock requestor, which may be the lock holder (if a lock is not refused) can keep the handle for unlocking the data range.

To unlock a data range, a lock holder can pass a handle to a central lock service. In response, the central lock service can identify a set corresponding to the handle. The intersection of this set (which is the complement of the original passed condition) and the current lock set can be calculated and stored as the new lock set. In addition, the handle and its associated set can be removed from the directory of open lock requests.

To improve reliability, each of the actions from converting a condition to a set to creating the new lock set when a data range is unlocked, can be exclusive in the system.

Application to Authorization

Today's implementations for authorization-checks define authorizations positively. Authorizations can be (inclusively) added to a referenced authorization profile but cannot be (exclusively) subtracted from it.

If a role authorization was expressed on a multi-dimensional set, it may be possible to derive user authorizations from the role authorization by simply including (union) and/ or excluding (intersection with the complement) a user-specific authorization set from a referenced role authorization set.

For example, a multi-dimensional set object may represent roles corresponding to resources. In that example, a first dimension may represent available roles and a second dimension may represent resources. If a user requests access to a resource, a check of containedness can be performed for the role corresponding to the user and the resource. If the combination of the role and the resource, as a tuple, are included in the multi-dimensional set object, the user may be granted access; otherwise, the user may be denied access.

The disclosed subject matter and all of the functional operations described herein can be implemented in digital electronic circuitry, or in computer software, firmware, or hardware, including the structural means disclosed in this specification and structural equivalents thereof, or in combinations of them. The disclosed subject matter can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment.

One type of programming language, known as an object oriented programming language, may use classes to define data structures. A class defines the members of an object. Objects are reusable software components. Each object is an instance of a class. Members of a class may include methods, variables, and references. Methods, also known as procedures, functions, and the like, include a series of statements that are compiled and/or executed by a processor and/or virtual machine. Methods may generate a return value, also known as output. Methods can use mechanisms and techniques other than return values to produce output, including mechanisms that cause information to be written to a file, displayed on a display device, or sent over a network. Methods are invoked by a function call. A function call specifies the method name and may provide arguments that a called method can manipulate. Constructors are a special type of method that initializes an object and/or generates an instance of an object. Variables, also known as parameters, attributes, and the like, can be assigned a value. Variables may be constant, such that the assigned value need not change during the execution of a program, or dynamic, such that the assigned value may change during the execution of a program. Variables can be of any data type, including character, integer, float, packed integer, and user-defined class. Variables can also be in the form of a reference-type variable, known as a pointer. A reference need not be a variable, and can be used to reference a variable. In other programming languages, or types of programming languages, programming constructs other than a class may represent data structures.

A computer program does not necessarily correspond to a file. A program can be stored in a portion of a file that holds other programs or data, in a single file dedicated to the program in question, or in multiple coordinated files (e.g., files that store one or more modules, sub-programs, or portions of code). A computer program can be deployed to be executed on one computer or on multiple computers at one site or distributed across multiple sites and interconnected by a communication network.

The processes and logic flows described herein, including the method steps of the disclosed subject matter, can be performed by one or more programmable processors executing one or more computer programs to perform functions of the disclosed subject matter by operating on input data and generating output. The processes and logic flows can also be performed by, and apparatus of the disclosed subject matter can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the disclosed subject matter can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The disclosed subject matter can be implemented in a computing system that includes a back-end component (e.g., a data server), a middleware component (e.g., an application server), or a front-end component (e.g., a client computer having a graphical user interface or a Web browser through which a user can interact with an implementation of the disclosed subject matter), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the methods of FIGS. 6, 7, 8A-8B, 9A-9C, and 10A-10C as being composed of certain processes, additional, fewer, and/or different processes can be used instead. For example, the processes of FIGS. 10A through 10C may be improved by calculating a hash value for every multi-dimensional set (e.g., a practically unique Secure Hash Algorithm v. 1.0 (i.e., SHA1) hash value). This may improve performance related to detecting whether two set objects are or are not equal as two hash values may be the same for two multi-dimensional sets that represent the same collection of objects, thus a multi-dimensional set need not be traversed and/or compared against another multi-dimensional set each time the equality of two multi-dimensional sets is calculated. Similarly, the processes need not be performed in the order depicted.

Although a few implementations have been described in detail above, other modifications are possible. For example, although a certain representation of sets as set objects has been illustrated, modifications can be made to the representations. As another example, although bit vectors and bit arrays are used throughout the description to describe the data structure that may represent set objects, similar structures may be used to store partition sets. For example, the bit data type of a programming need not be used and a vector of integers may be used where a scheme for interpreting those integers appropriately may be devised. Other implementations may be within the scope of the following claims.

What is claimed is:

1. A computer program product, tangibly embodied in a machine-readable storage device, the computer program product comprising instructions operative to cause data processing apparatus to:

normalize a first value of a partition vector, a last value of the partition vector, or both the first minimum and maximum values of the partition vector of a first set object in accordance with a first process to produce a normalized version of the first set object, the partition vector comprising ordered values from the first value to the last value and further comprising a set of knot values ordered from a first knot value to a last knot value, wherein:
  normalizing the first value comprises keeping the first value or removing the first value to make a second value of the partition vector the first value when the first knot value of the partition vector is a second minimum value of a universal set object corresponding to the first set object, the second minimum value being both a minimum value supported by a data type and defined to be in the universal set object; and
  normalizing the last value comprises keeping the last value or removing the last value to make a penultimate value of the partition vector the last value when the last knot value of the partition vector is a second maximum value of the universal set object, the second maximum value being both a maximum value supported by a data type and defined to be in the universal set object; and
perform a set operation on the normalized version of the first set object to generate a result, wherein, the normalized version of the first set object has the normalized first value, the normalized last value, or both the normalized first and normalized last values normalized in accordance with the first process.

2. The computer program product of claim 1, wherein the first set object uses a combination of knot elements and partition entries to represent a collection of objects, the first value is a first knot element of the first set object, and the instructions to modify the first value comprise instructions to modify the first set object to include a value of a second partition entry in a first partition entry, the first and second partition entries being in an ordered sequence of partition entries with the first partition entry being before the second partition entry.

3. The computer program product of claim 2, wherein the partition entry is a partition bit.

4. The computer program product of claim 1, wherein the first set object uses a combination of knot elements and partition entries to represent a collection of objects, the last value is a last knot element of the first set object, and the first maximum value of the first set object is modified if the first maximum value is the same as the second maximum value.

5. The computer program product of claim 1, wherein the normalized version of the first set object is further normalized in accordance with a second process, and, the instructions are further operative to:
  normalize consecutively-ordered elements of the first set object in accordance with the second process, wherein a first element is in a first ordered sequence before the second element and the universal set object includes the first and second elements as an uninterrupted second ordered sequence of elements.

6. The computer program product of claim 1, wherein the normalized version of the first set object is further normalized in accordance with a second process and a third process, and, the instructions are further operative to:
  normalize one or more representations of one or more intervals in the first set object in accordance with the second process, the intervals representing a span of objects in the first set object; and
  normalize consecutively-ordered elements of the first set object in accordance with the third process, wherein a first element is in a first ordered sequence before the second element and the universal set object includes the first and second elements as an uninterrupted second ordered sequence of elements.

7. The computer program product of claim 1, wherein the normalized version of the first set object is further normalized in accordance with a second process, and, the instructions are further operative to:

normalize one or more representations of one or more intervals in a first set object in accordance with the second process, the intervals representing a span of objects in the first set object.

8. A computer program product, tangibly embodied in a machine-readable storage device, the computer program product comprising instructions that cause one or more data processing apparatus to:

receive a set object representing a collection of objects using a knot vector and a partition vector, the knot vector comprising knot values ordered from a first knot value to a last knot value and defining a partition of a universal set, the partition vector comprising sets partition vector elements ordered from a first set of set of partition vector elements to a last set of partition vector elements, each set of partition vector elements corresponding to one of the knot values or to a link representing a gap between two consecutive knot values, each link comprising a range of values between the two consecutive knot values, each set of partition vector elements that corresponds to one of the knot values representing whether the set object represents values in the collection of objects that are below, at, or above the corresponding knot value;

remove the first set of partition vector elements if the first knot value is a minimum technical value and if a minimum value of the universal set is the same as the first knot value, the minimum technical value being a minimum value representable by the data processing apparatus or chosen to be supported for a for a data type corresponding to the knot value, remove the last set of partition vector elements if the last knot value is a maximum technical value and if a maximum value of the universal set exists and is equal to the last knot value, the maximum technical value being a maximum value representable by the data processing apparatus or chosen to be supported for a for the data type corresponding to the knot value;

returning a normalized version of the set object; and perform a set operation on the normalized version of the set object to generate a result.

9. A computer program product as in claim 8, further comprising instructions that cause the one or more data processing apparatus to:

determine whether a universal set value exists between each two consecutive knot values, thereby indicating that the link representing the gap between the two consecutive knot values is a redundant link; and deriving a new link to replace the redundant link from two surrounding sets of partition vector elements.

10. A computer program product as in claim 8, further comprising instructions that cause the one or more data processing apparatus to:

normalizing intervals by replacing open intervals with closed intervals.

11. A computer program product as in claim 8, further comprising instructions that cause the one or more data processing apparatus to:

define temporary variables comprising a temporary index that is used to iterate through the knot values, a temporary knot vector, and a temporary partition set vector which are used to return the normalized version of the set object.

* * * * *